United States Patent
Iguchi et al.

(10) Patent No.: US 9,784,372 B2
(45) Date of Patent: Oct. 10, 2017

(54) SEALING DEVICE

(75) Inventors: Tetsuya Iguchi, Tokyo (JP); Kazuhiro Iwashita, Tokyo (JP); Yasuhiro Kuroki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 1613 days.

(21) Appl. No.: 13/132,973

(22) PCT Filed: May 21, 2010

(86) PCT No.: PCT/JP2010/058591
§ 371 (c)(1),
(2), (4) Date: Jun. 6, 2011

(87) PCT Pub. No.: WO2010/137521
PCT Pub. Date: Feb. 12, 2010

(65) Prior Publication Data
US 2011/0233872 A1    Sep. 29, 2011

(30) Foreign Application Priority Data

May 25, 2009    (JP) ................................ 2009-124804

(51) Int. Cl.
*F16J 15/34*    (2006.01)

(52) U.S. Cl.
CPC ....... *F16J 15/3412* (2013.01); *F16J 15/3424* (2013.01)

(58) Field of Classification Search
CPC ............................ F16J 15/3412; F16J 15/3424
(Continued)

(56) References Cited

U.S. PATENT DOCUMENTS 3,527,465 A * 9/1970 Guinard .......................... 277/400
5,501,470 A * 3/1996 Fuse et al. .................... 277/400
(Continued)

FOREIGN PATENT DOCUMENTS

JP    57161368    10/1982    ............... F16J 15/34
JP    61063496     4/1986    ............. F04D 29/12
(Continued)

OTHER PUBLICATIONS

PCT Notification of Transmittal Translation of The International Preliminary Report on Patentability, dated Nov. 29, 2011 (6 pgs).
(Continued)

*Primary Examiner* — Vishal Patel
*Assistant Examiner* — L. Susmitha Koneru
(74) *Attorney, Agent, or Firm* — Hayes Soloway P.C.

(57) ABSTRACT

Provided is a sealing device that increases the lubricity of seal surfaces, prevents leakage of sealed fluids, and prevents excessive heat generation and excessive friction at seal surfaces. Said sealing device, which is of the type that seals a fluid trying to leak from the outer periphery of a sealing surface towards the inner periphery thereof, forms at least two dimples in a circumferential direction in each of a plurality of rows arranged in a radial direction on a sealing surface of a stationary-side sealing element or a rotating-side sealing element. Each dimple is tilted by a dimple angle θ between 0° and 90°, exclusive, such that the tip of that dimple in the direction of rotation is tilted toward the inner periphery side. In each of the plurality of rows of dimples, land areas are formed in the circumferential direction between the proximate tips of adjacent dimples. For each of the plurality of rows of dimples, if a circle is drawn through the centers of the dimples in that row, let L1 be the distance along the circle from the point the circle enters a dimple to the point the circle leaves that dimple, and let L2 be the
(Continued)

length, along the circle, of the land areas between dimples. The dimples are characterized by being arranged such that the gap ratio L1/L2 is between 0.001 and 0.1, inclusive.

4 Claims, 22 Drawing Sheets

(58) Field of Classification Search
USPC .................................................. 277/399, 400
See application file for complete search history.

(56) References Cited

U.S. PATENT DOCUMENTS

| 5,529,315 | A | * | 6/1996 | Borrino et al. | 277/352 |
| 6,705,844 | B2 | * | 3/2004 | Englander | 417/423.4 |
| 7,052,016 | B2 | * | 5/2006 | Tejima | 277/399 |
| 7,744,094 | B2 | * | 6/2010 | Yanagisawa et al. | 277/399 |
| 7,963,525 | B1 | * | 6/2011 | Garrison | 277/416 |
| 8,091,898 | B2 | * | 1/2012 | Garrison | 277/399 |
| 8,356,819 | B2 | * | 1/2013 | Vasagar et al. | 277/399 |
| 2003/0178781 | A1 | * | 9/2003 | Tejima | 277/399 |
| 2003/0189294 | A1 | * | 10/2003 | Tejima | 277/399 |
| 2005/0212217 | A1 | * | 9/2005 | Tejima | 277/399 |
| 2005/0242518 | A1 | * | 11/2005 | Rippl et al. | 277/399 |
| 2011/0215531 | A1 | * | 9/2011 | Tokunaga et al. | 277/399 |

FOREIGN PATENT DOCUMENTS

| JP | 11236976 | 8/1999 | F16J 15/34 |
| JP | 2003343741 | 12/2003 | F16J 15/34 |
| JP | 2004003578 | 1/2004 | F16J 15/34 |

OTHER PUBLICATIONS

International Search Report issued in Pct/JP2010/058591 dated Aug. 31, 2010 (4 pgs).

* cited by examiner

Fig. 6a GAP RATIO 0.003

Fig. 6c GAP RATIO 0.05

Fig. 6b GAP RATIO 0.01

Fig. 6d GAP RATIO 0.1

Fig. 7a GAP RATIO 0.047

Fig. 7b GAP RATIO 0.1

Fig. 8
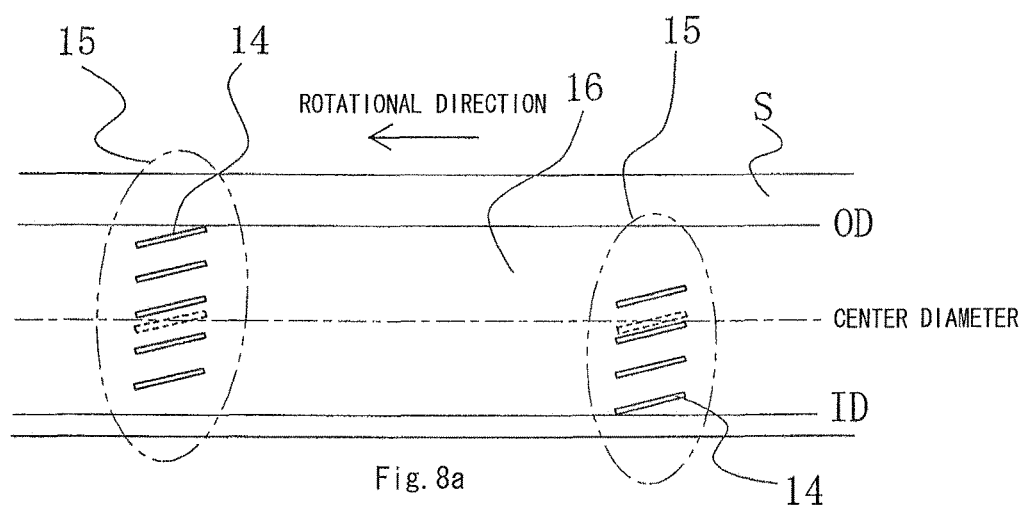
Fig. 8a
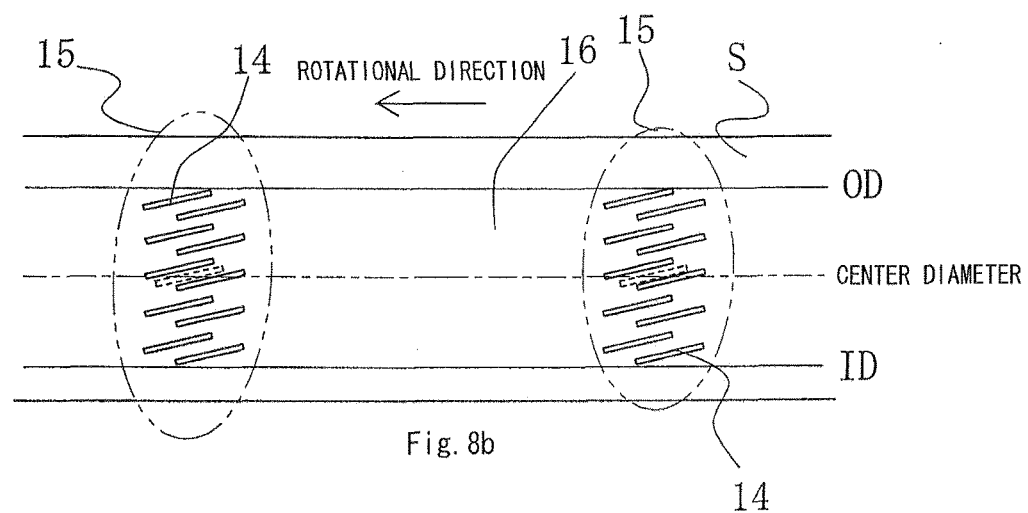
Fig. 8b

Fig. 9
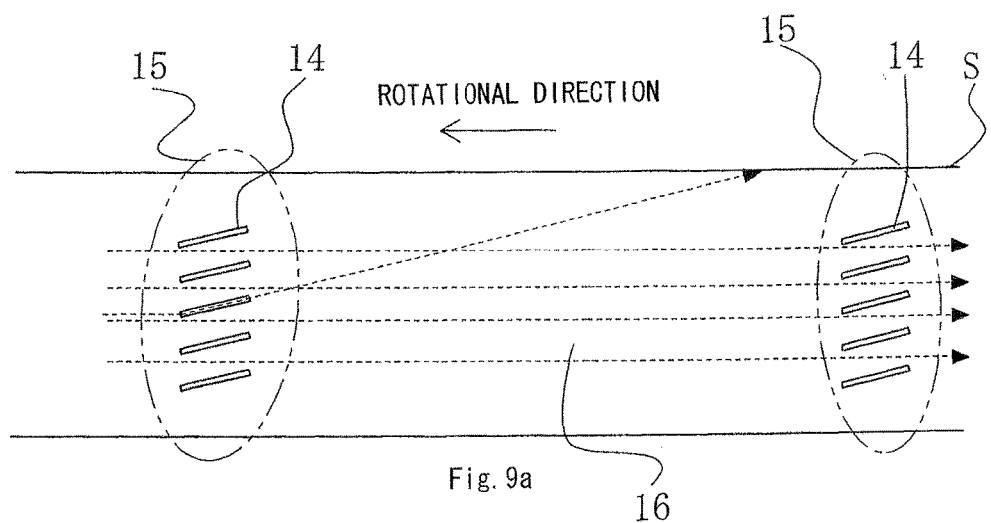
Fig. 9a
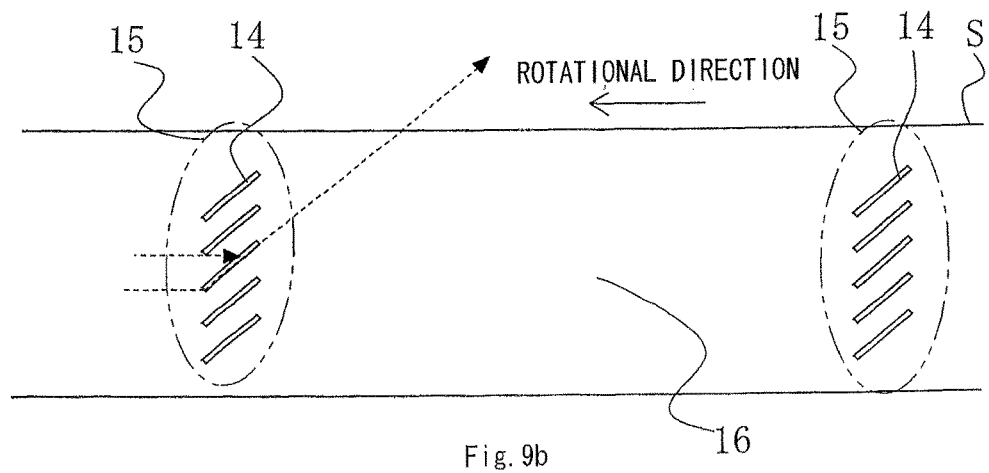
Fig. 9b

Prior Art

Prior Art

Prior Art

SEALING DEVICE

TECHNICAL FIELD

The present invention relates to a sealing device of a mechanical sealing structure, used in aircraft engine gearbox seals, rocket engine seals, common industrial pump seals, and the like, for example; and particularly relates to a sealing device that increases the lubricity between sealing surfaces and prevents leakage of sealed fluids.

BACKGROUND ART

With conventional mechanical seals used in, for example, aircraft engine gearboxes, lubricating oil, which is a sealed fluid on an upstream side, penetrates between the sealing surfaces of a stationary side and a rotating side, forming an ultrathin film and lubricating the borders. When the upstream side is high in pressure, the lubricating oil between the sealing surface is pushed out to the downstream side by the pressure, causing leakage. When axial vibration is excessive, there is additional leakage in the axial direction in relation to the shaking of the rotating-side sealing surface, the space between the sealing surfaces widens, and the fluid leaks therein. To counter this, when an axial pressure force from a spring or the like is increased, the ultrathin oil film between the sealing surfaces becomes thinner and leakage is suppressed, but this approaches solid lubrication or direct contact; therefore, the amount of abrasion becomes excessive and the device becomes less durable. The sliding torque also becomes excessive, and the load on the device increases. Other problems also arise, such as the need to increase the rate of cooling flow.

To provide a function for controlling the thickness of the lubricating film covering, which is the sealed fluid, and also controlling the leakage amount of the sealed fluid, there is known in the art a sliding material in which a hard film covering is formed on the surface of an annular underlying metal material, and numerous dimples having a substantially consistent cross-sectional shape are formed over the entire sliding surface in a systematic alignment pattern; for example, substantially elliptical dimples 60 μm in width and 120 μm in length, whose major diameters are inclined 45° in relation to the sliding direction, are formed in the sliding surface at a surface area ratio of 8% relative to the surface area of the sliding surface, as shown in FIG. 20 (hereinbelow referred to as Prior Art 1, see Patent Document 1, for example).

According to Prior Art 1, the thickness of the lubricating film covering and the amount of sealed fluid leakage are controlled by the dimples formed in the sealing surface, and sliding characteristics similar to fine ceramics can be achieved, depending on the abrasion resistance of the sliding surfaces.

In another known sliding component (hereinbelow referred to as "Prior Art 2," see Patent Document 2, for example), to reduce the coefficient of friction of the sliding surface and reduce leakage of the sealed fluid in the sliding surface, the sliding surface has a plurality of long, thin dimples which are separated by a border reference line and which have different inclined directions between those on the outer periphery side and those on the inner periphery side, as shown in FIG. 21, wherein the tips in the rotational direction of the outer periphery dimples are inclined toward the outer periphery while the tips in the rotational direction of the inner periphery dimples are inclined toward the inner periphery. The flat surface of each dimple is an elliptical or rectangular shape, for example, having a width of $50\times10^{-6}$ m to $1000\times10^{-6}$ m, a length of twice the width or more and ½ the width of the sliding surface or less, and a depth of $1\times10^{-6}$ m to $25\times10^{-6}$ m.

According to Prior Art 2, the expected effect is that a thick lubricating film covering of the sealed fluid will be maintained on the sliding surface between outer periphery dimples and inner periphery dimples, which would improve sealing performance.

In yet another known sliding component (hereinbelow referred to as "Prior Art 3," see Patent Document 3, for example), to reduce the coefficient of friction of the sliding surface and reduce leakage of the sealed fluid in the sliding surface, the sliding surface has a first sliding surface on the side of the sealed fluid and a second sliding surface on the side opposite the sealed fluid, the first sliding surface has a plurality of at least one type of elliptical or rectangular dimples which are inclined relative to a direction tangential to the rotation of the circle, in the direction in which the longitudinal tips approach the peripheral surface on the side of the sealed fluid, as shown in FIG. 22. Each dimple is formed such that the longitudinal maximum width is $100\times10^{-6}$ m or greater and $1000\times10^{-6}$ m or less; the transverse length is $500\times10^{-6}$ m or greater, greater than the width of the dimple, and less than the radial width of the first sliding surface; and the groove depth of each dimple is formed to be $1\times10^{-6}$ m or greater, up to $25\times10^{-6}$ m. The second sliding surface has a flat surface.

According to this Prior Art 3, the expected effects are that the coefficient of friction of the sliding surface will be reduced by the lubricating film covering maintained on the dimpled first sliding surface, the lubricating film covering present on the first sliding surface will be sealed by the second sliding surface, and the sealing performance of the sealed fluid will be improved by the second sliding surface while the lubricating effect is maintained by the lubricating film covering.

PRIOR ART DOCUMENTS

Patent Documents

Patent Document 1: Japanese Laid-open Patent Application No. H11-236976

Patent Document 2: Japanese Laid-open Patent Application No. 2003-343741

Patent Document 3: Japanese Laid-open Patent Application No. 2004-3578

DISCLOSURE OF THE INVENTION

Problems to be Solved by the Invention

In Prior Art 1 described above, although the dimple width, length, and surface area ratio relative to the surface area of the sliding surface are established, since the relationship between the pumping effect of all the dimples and the surface pressure of the sealing surface is not taken into account, the pumping effect and surface pressure are not both satisfied.

In Prior Arts 2 and 3, the design is such that a lubricant is essentially sealed in the sliding surfaces, an effect of draining the sealed fluid through the dimples to the high-pressure side (the upstream side) (hereinbelow also referred to as the "pumping effect") is not an object, and the dimple angle, width, length, and depth are established so that the lubricant is sealed in the sealing surface; but as with Prior Art 1, since the relationship between the pumping effect of all the dimples and the surface pressure of the sealing surface is not taken into account, the pumping effect and surface pressure are not both satisfied.

An object of the present invention is to provide a sealing device in which long, thin grooves (hereinbelow referred to as "dimples") are formed in numerous phases around the circumferential direction of a sealing surface on a rotating side or a static side, and are also longitudinally arranged in the radial direction, wherein the dimples are arranged so that both the pumping effect of all the dimples and the surface pressure of the sealing surface are satisfied, whereby the lubricity of the sealing surface is increased, leakage of the sealed fluid is prevented, and excessive heat generation and excessive abrasion in the sealing surface are also prevented.

Means for Solving these Problems

The sealing device according to a first aspect of the present invention for achieving the object described above is a sealing device having a contact-type mechanical sealing structure in which a stationary-side sealing element and a rotating-side sealing element slide intimately against each other between a seal housing and a rotating shaft inserted through an inner periphery of the seal housing, the format of the sealing device being adapted for sealing a fluid prone to leak from an outer periphery of a sealing surface toward an inner periphery; wherein the sealing device characterized in that two or more groups of a plurality of dimples longitudinally arranged in the radial direction are formed around the circumferential direction on a sealing surface of the stationary-side sealing element or the rotating-side sealing element, the dimples have a dimple angle θ at which their tips in the rotational direction are tilted toward the inner periphery, the angle θ is expressed by the relation 0<θ<90°, land areas in the circumferential direction are formed between proximate tips of adjacent groups of the longitudinally arranged dimples, and the dimples in individual rows of the dimples longitudinally arranged in the radial direction are aligned so that a gap ratio L1/L2, which represents the ratio between the length L1 of a dimple along the circumference of a circle passing through the center of the dimple and the length L2, along the circumference of the same circle, of the land area formed between adjacent dimples, is within the range indicated by the expression below.

$$0.001 \leq L1/L2 \leq 0.1$$

According to the first aspect, since the pumping effect of all of the dimples and the surface pressure of the sealing surface can both be satisfied, it is possible to increase the lubricity of the sealing surface and prevent the sealed fluid from leaking, and also to prevent excessive heat generation and excessive abrasion in the sealing surface.

The sealing device according to a second aspect of the present invention is the sealing device according to the first aspect, characterized in that the gap ratio L1/L2 is preferably in a range of 0.001≤L1/L2≤0.05.

According to the second aspect, the surface pressure can be reduced while ensuring the lubricity of the sealing surface.

The sealing device according to a third aspect of the present invention is the sealing device according to the first or second aspects, characterized in that the dimples in the individual rows of the dimples longitudinally arranged in the radial direction do not pass through to the inner periphery side of the sealing surface.

According to the third characteristic, the sealed fluid can be prevented from leaking during when the sealing device is not operating.

The sealing device according to a fourth aspect of the present invention is the sealing device according to the first through third aspects, characterized in that the depth of the dimples is 1 to 200 μm.

According to the fourth characteristic, the pumping effect of the dimples can be further increased.

The sealing device according to a fifth aspect of the present invention is the sealing device according to the first through fourth aspects, characterized in that the aspect ratio l/b between the length l and the width b of the dimples is 2 to 30.

According to the fifth characteristic, it is possible to satisfy both the pumping effect of the dimples and the lubricity of the sealing surface.

Effect of the Invention

The present invention exhibits superior effects such as the following.

(1) In a sealing device of a type that seals a fluid prone to leak from an outer periphery of a sealing surface towards an inner periphery, two or more groups of dimples longitudinally arranged in the radial direction are formed in the circumferential direction on a seal surface of a stationary-side sealing element or a rotating-side sealing element. The dimples have a dimple angle θ at which their tips in the rotational direction are tilted towards the inner periphery. The angle θ is expressed by the relation 0<θ<90°. Land areas in the circumferential direction are formed between proximate tips of adjacent groups of longitudinally arranged dimples. The dimples in each row of the dimples longitudinally arranged in the radial direction are aligned so that a gap ratio L1/L2, which represents the ratio between the length L1 of a dimple along the circumference of a circle passing through the center of the dimple and the length L2, along the circumference of the same circle, of the land area formed between adjacent dimples, is between 0.001 and 0.1, inclusive. As a result, the pumping effect of all of the dimples and the surface pressure of the sealing surface can both be satisfied; therefore, it is possible to increase the lubricity of the sealing surface and prevent the sealed fluid from leaking, and also to prevent excessive heat generation and excessive abrasion in the sealing surface.

(2) Due to the gap ratio L1/L2 being in a range of 0.001≤L1/L2≤0.05, the surface pressure can be reduced while ensuring the lubricity of the sealing surface.

(3) Due to the dimples in each row of the dimples longitudinally arranged in the radial direction not passing through to the inner periphery side of the sealing surface, the sealed fluid can be prevented from leaking during when the sealing device is not operating (4) Due to the depth of the dimples being in a range of 1 to 200 μm, the pumping effect of the dimples can be further increased.

(5) Due to the aspect ratio l/b between the width b and length l of the dimples being 2 to 30, it is possible to satisfy both the pumping effect of the dimples and the lubricity of the sealing surface.

BRIEF DESCRIPTION OF THE DRAWINGS

FIG. 1 is a cross-sectional view showing a sealing device having a contact-type mechanical sealing structure in which a stationary-side sealing element and a rotating-side sealing element slide against each other between a seal housing and a rotating shaft inserted through the inner periphery of the housing, wherein dimples of the present invention are formed in a mating ring, which is the rotating-side sealing element;

FIG. 8 is an explanatory drawing for describing a method for calculating the gap ratio in various patterns of longitudinally arranged dimples;

FIG. 9 is an explanatory drawing for describing the state in which a fluid film is formed in the land areas, both in a case in which dimples adjacent in the radial direction within one group of longitudinally arranged dimples do not overlap each other in the radial direction, and in a case in which they do overlap;

BEST MODE FOR CARRYING OUT THE INVENTION

Modes for carrying out the sealing device according to the present invention are described in detail with reference to the accompanying drawings, but the present invention is not to be interpreted as being limited to these modes; various modifications, revisions, and improvements can be added based on the knowledge of those skilled in the art as long as they do not deviate from the scope of the present invention.

Figure 1:
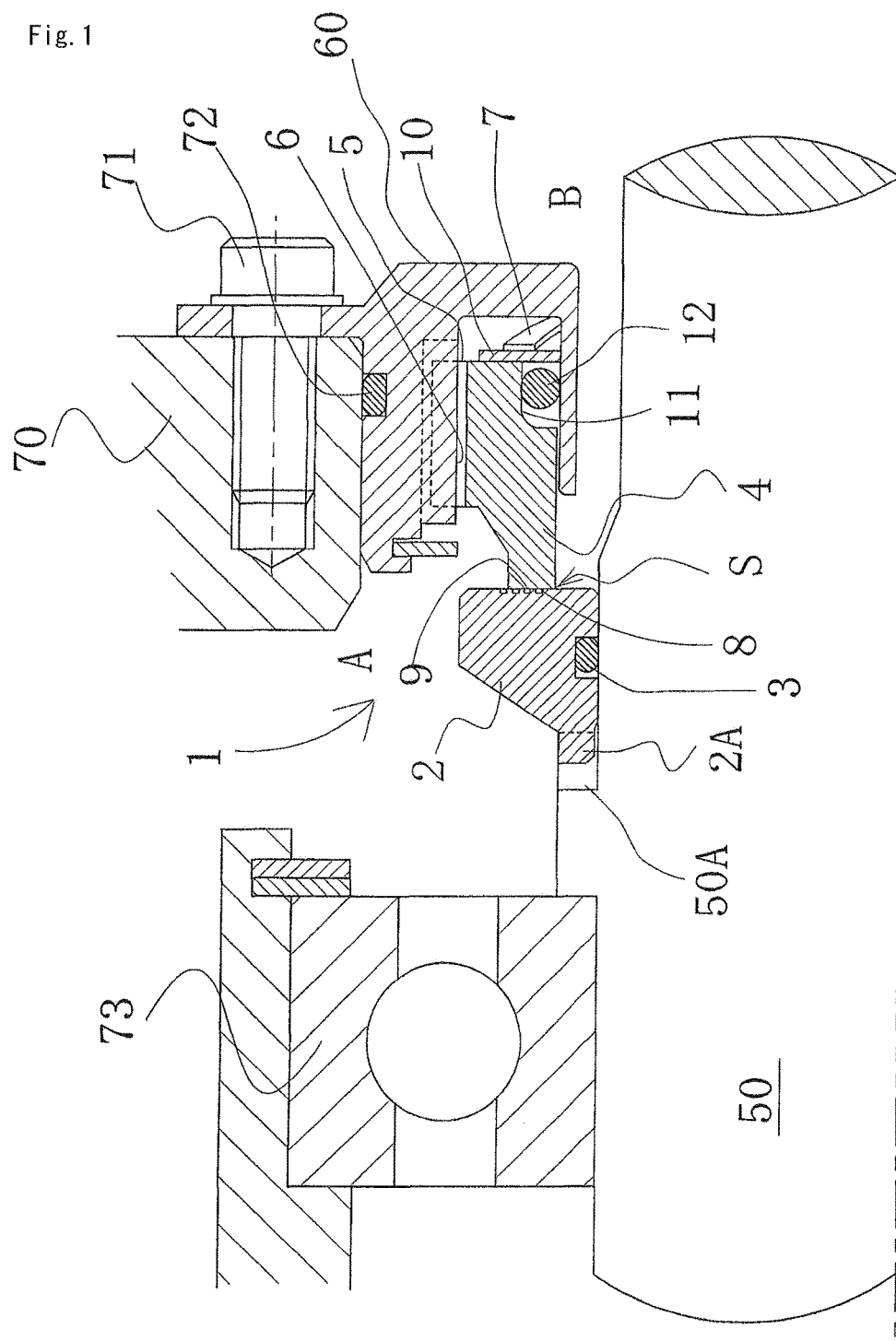
FIG. 1 shows an applied example in an aircraft engine gearbox according to an embodiment of the present invention.

FIG. 1 shows an applied example in an aircraft engine gearbox, for example, and FIG. 1 is a cross-sectional view showing a sealing device having a contact-type mechanical sealing structure in which a stationary-side sealing element and a rotating-side sealing element slide against each other between a seal housing and a rotating shaft inserted through the inner periphery of the housing, wherein dimples of the present invention are formed in a mating ring, which is the rotating-side sealing element.

A mechanical seal 1 is attached in an attachment space between a rotating shaft 50 and a seal housing 60 mounted to an aircraft engine gearbox casing 70 by a bolt 71 or another fixing means. An O ring 72 is mounted between the casing 70 and the seal housing 60.

The rotating shaft 50 is rotatably supported via a bearing 73.

A mating ring 2, which is the rotating-side sealing element, is attached via an O ring 3 so that a protuberance 2A fits with a recession 50A of the rotating shaft 50.

A seal ring 4, which is the stationary-side sealing element, is supported in the seal housing 60 so as to be incapable of rotating but capable of moving in the axial direction due to a recession 5 formed in the outer periphery thereof being fitted with a protuberance 6 of the seal housing 60. The seal ring 4 is pressed from the rear end side by a wave spring 7 provided between the seal ring 4 and the seal housing 60, the pressure being applied via a washer 10 so that a sealing surface 8 of the seal ring 4 presses against a sealing surface 9 of the opposing mating ring 2. The member for pressing the seal ring 4 is not limited to a wave spring; a coil spring can be used, but a wave spring has an advantage over a coil spring in that its axial length can be smaller. An O ring groove 11 is provided in the inner peripheral surface of the seal ring 4, and an O ring 12 is mounted in this O ring groove 11, sealing the bond between the seal ring 4 and the seal housing 60.

Thus, a high-pressure side (upstream side) A and a low-pressure side (downstream side) B of the casing 70 are sealed by a sealing surface S in which the sealing surface 8 of the seal ring 4 and the sealing surface 9 of the mating ring 2 press together (meaning, a sealing surface formed by the sealing surface 8 of the seal ring 4 and the sealing surface 9 of the mating ring 2; likewise hereinbelow).

In the case of an aircraft engine gearbox, the bearing 73 is lubricated by lubricating oil, and the difference between the pressure of the lubricating oil in the gearbox and the pressure outside is approximately 0.1 to 0.15 MPa. The rotational speed of the rotating shaft 50 is 4000 to 30000 rpm during operation, and the peripheral velocity of the sealing surface is 30 to 60 m/s.

The material used for the mating ring 2 is chromium molybdenum steel, aluminum molybdenum steel, or another nitriding steel; or stainless steel or the like, but is not particularly limited to these examples. Nitriding, chrome plating, or another process is performed as necessary on the sealing surfaces. Carbon is used as the material of the seal ring 4.

Figure 2:
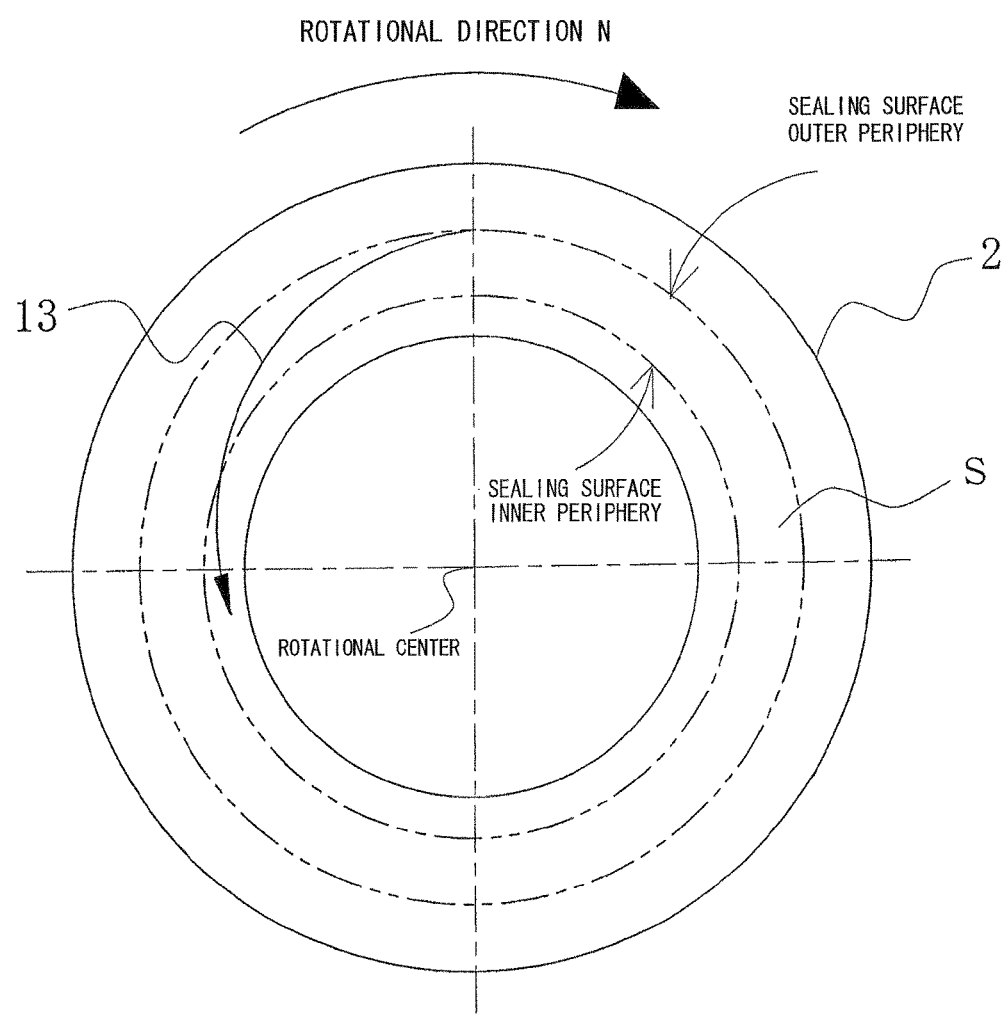
FIG. 2 illustrates the leakage path of the sealed fluid in a conventional sealing surface, wherein the sealing surface has not been imparted with dimples or otherwise machined.

FIG. 2 describes the leakage path of the sealed fluid, e.g., the lubricating oil inside the gearbox (hereinbelow referred to generally as "the sealed fluid") in the sealing surface S in which the sealing surface 8 of the seal ring 4 and the sealing surface 9 of the mating ring 2 press together. In this case, machining such as dimpling is not performed in the sealing surface S.

At this time, when the outer periphery is under high pressure, the sealed fluid on the high-pressure side (upstream side) present on the outer periphery of the sealing surface S is prone to penetrate through the sealing surface S to the inner periphery because of the pressure difference with the low-pressure side (the downstream side). At this time, the mating ring 2 rotates in a rotational direction N, and the sealed fluid therefore leaks through the path shown by the number 13. When vibration in the axial direction is excessive, there is additional leakage in the axial direction in relation to the shaking of the rotating-side sealing surface, the space between the sealing surfaces widens, and the fluid leaks therein. To counter this, when axial pressure force from a spring or the like is increased, the ultrathin film covering between the sealing surfaces becomes thinner and leakage is suppressed, but this approaches solid lubrication or direct contact; therefore, the amount of abrasion becomes excessive and the device becomes less durable. The sliding torque also becomes excessive, and the load on the device increases. Other problems also arise, such as the need to increase the rate of cooling flow.

Figure 3:
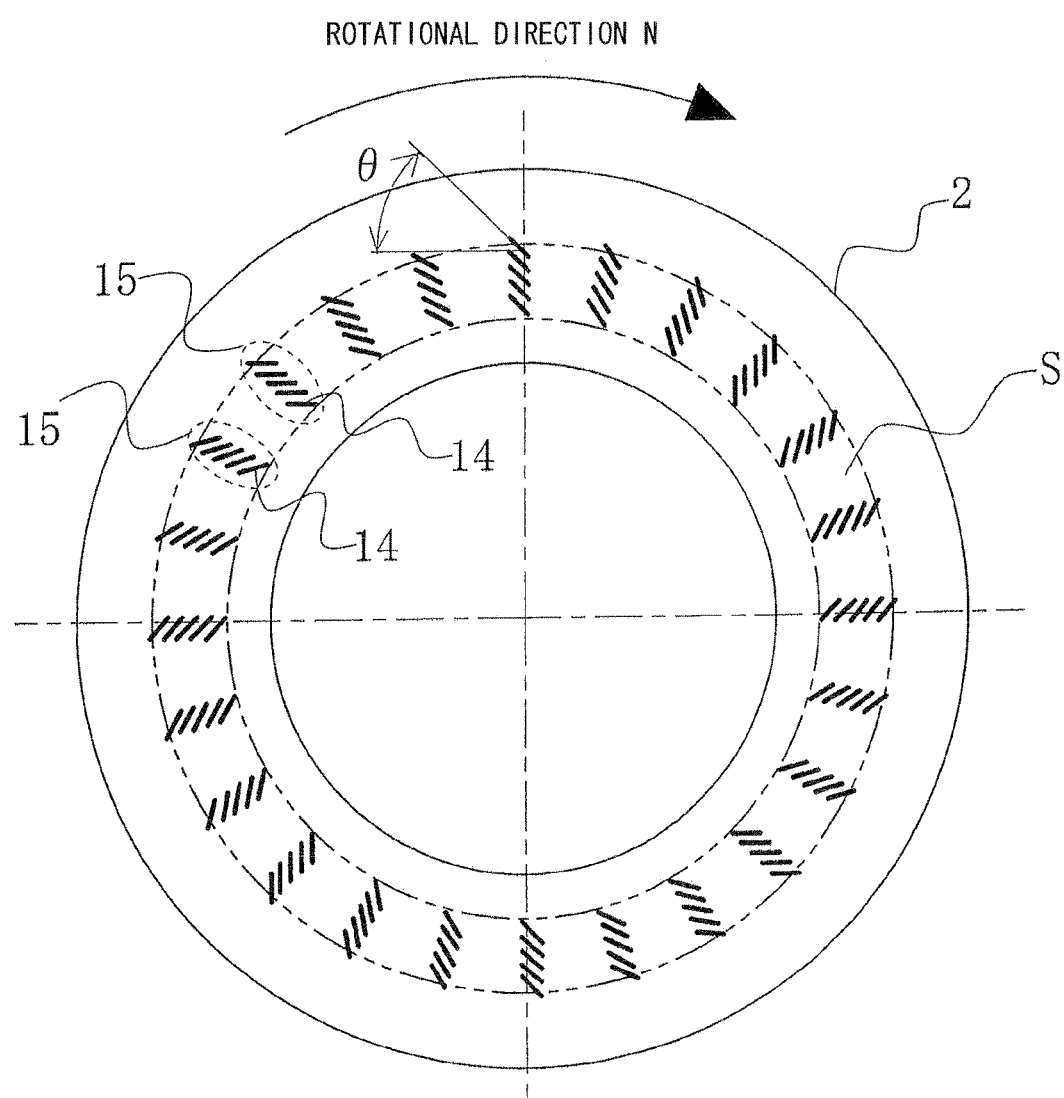
FIG. 3 shows an example according to an embodiment of the present invention, wherein dimples that are several millimeters in length are provided to the sealing surface so that their tips in the direction of rotation are tilted towards the inner periphery side.

FIG. 3 shows an example in which dimples 14 measuring several millimeters in length, which maintain the pump effect of draining out the sealed fluid of the sealing surface S upstream through the centrifugal force created by the rotation of the sealing surface S, are provided so that their tips in the direction of rotation are tilted toward the inner periphery side in order to maintain the shape of the ultrathin film covering of the sealed fluid in the sealing surface S, to prevent the sealed fluid on the high-pressure upstream side from penetrating through the sealing surface S, and to prevent the upstream sealed fluid from penetrating through the sealing surface S opened by additional leakage in the axial direction.

When long dimples are formed, such as ones that are continuous from the downstream side to the upstream side, the draining effect (pumping effect) of the sealing surface S becomes too great, the lubricating film covering of the sealing surface S causes partial tearing of the film, and solid lubrication mode takes effect. In this case, the results are sliding heat generation, coking of the lubricating fluid due to thermal causes, and abrasion of the seal member, which reduce the longevity. To avoid this, the structure of the present invention is provided with numerous short dimples measuring several millimeters in length. The dimples fulfill the role of sealed fluid pockets, and sealed fluid that has penetrated from the upstream side can be temporarily retained; therefore, the effect of increasing the lubricity of the sealing surface S can also be achieved along with the pump effect of the sealed fluid.

In the example of FIG. 3, a case is shown in which the dimples 14 are formed in the sealing surface 9 of the mating ring 2, but dimples may instead be formed in the sealing surface 8 of the seal ring 4, or in both sealing surfaces. Taking static leaks into account, the dimples may also be provided not so as to pass through downstream of the sealing surface S (farther in than the inner periphery of the sealing surface S), but rather so as to pass through upstream (farther out than the outer periphery of the sealing surface S).

The width, depth, and incline of the dimples 14 are set according to separate usage conditions, but their optimum values will be described hereinafter.

The dimples 14 are formed as being longitudinally arranged in pluralities in the radial direction (each row containing five dimples in this example), and pluralities of longitudinally arranged dimples 15 are formed around the circumferential direction. In this example, twenty-four pluralities of longitudinally arranged dimples 15 are spaced at equal intervals of 15° in the circumferential direction, but the dimples do not necessarily need to be arranged systematically at equal intervals, nor are the intervals limited to 15°.

In the present invention, the phrase "a plurality of dimples longitudinally arranged in the radial direction" refers to a group of dimples (hereinbelow shortened to "longitudinally arranged dimples") aligned such that even if the dimples provided in the radial direction are misaligned in the circumferential direction, there is some circumferential overlap common to all the dimples. Cases of the radial intervals between dimples being non-uniform and cases of the dimple angles θ being inconstant are also included in the longitudinally arranged dimples of the present invention.

The term "dimple angle θ" refers to the angle that the center line of each dimple forms with the tangent of a circle passing through the center of that dimple.

Figure 4:
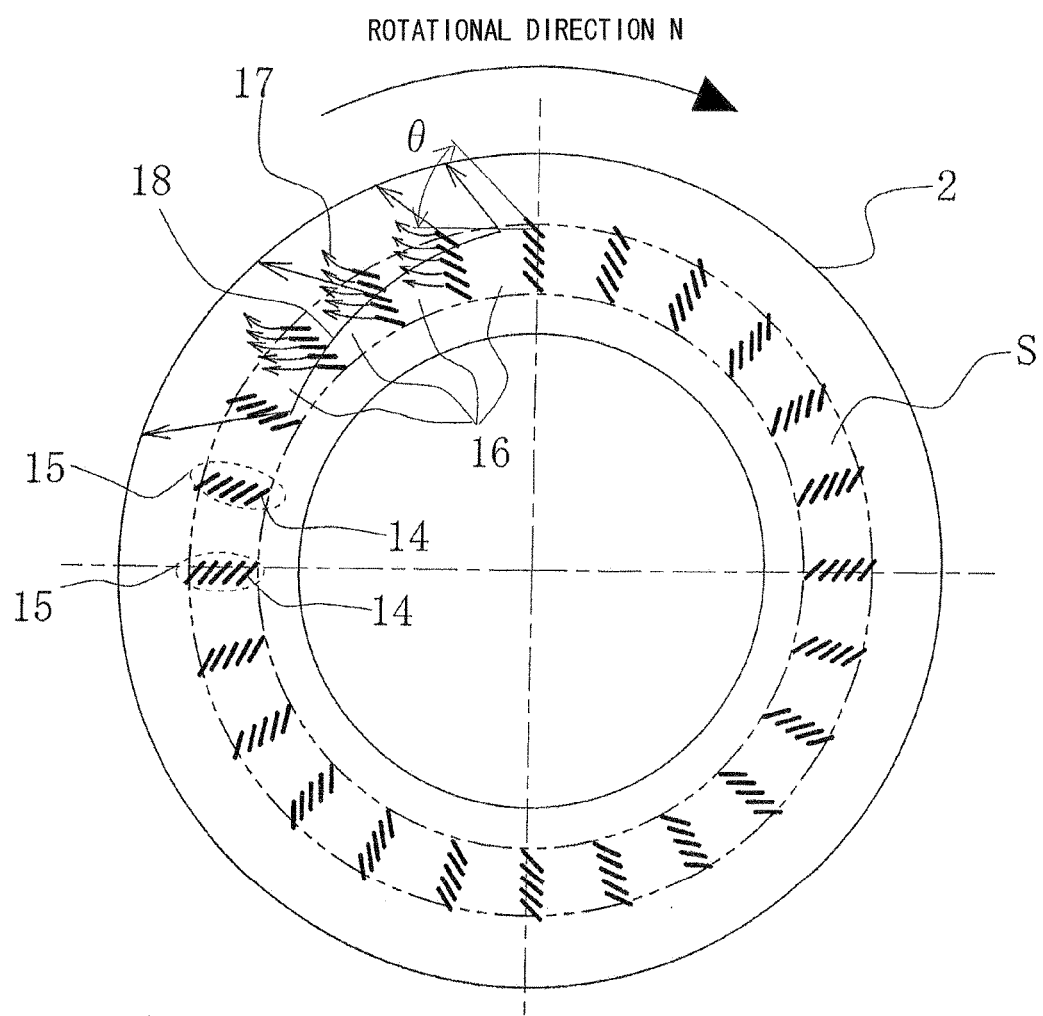
FIG. 4 shows the behavior of the sealed fluid in the sealing surface of FIG. 3.

FIG. 4 shows the behavior of the sealed fluid in the sealing surface S when the dimples 14 have been provided to the sealing surface S shown in FIG. 3.

The sealed fluid that has penetrated through the sealing surface S is prone to move downstream because of the pressure difference between the upstream side (the outer periphery side) and the downstream side (the inner periphery side), but with the rotation of the mating ring 2, the sealed fluid inside the dimples 14 is subjected to pumping action direction from the downstream side to the upstream side by the dimples 14 and drained to the upstream side as shown by the arrows 17. Therefore, most of the sealed fluid is drained to the upstream side before leaking inward from the inner periphery of the sealing surface S, as shown by the trajectory 18. The sealed fluid drained to the upstream side by the pumping action of the dimples 14 flows through land areas 16 in the circumferential direction formed between the proximate tips of longitudinally arranged dimples 15 that are adjacent in the circumferential direction, and the sealed fluid lubricates the land areas 16. Since there is sealed fluid inside the dimples 14, the sealing surface S is not subjected to solid lubrication, and excessive abrasion, abnormal heat generation, and the occurrence of high torque can be suppressed. Usually, since the dimples 14 do not pass through to the downstream side, they do not affect leakage during non-rotation. Since the dimples 14 do pass through to the upstream side, the sealed fluid is drained directly, which has the effect of further reducing the amount of leakage.

Figure 5:
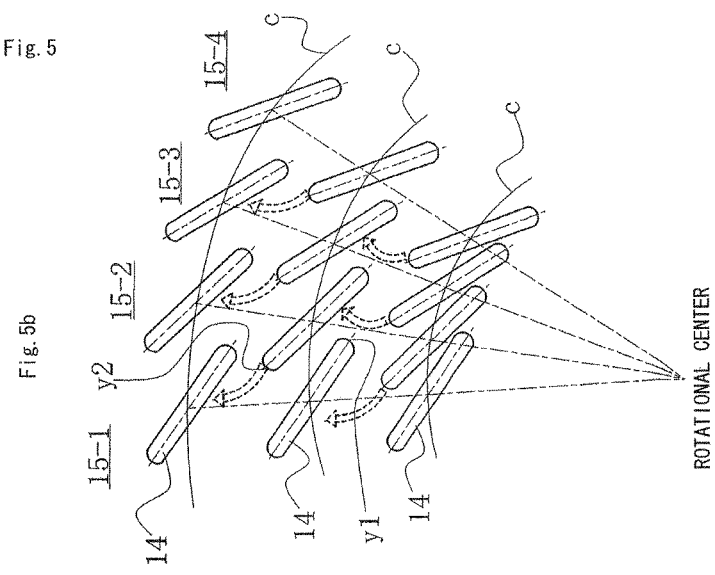
FIG. 5(a) is an enlarged explanatory drawing focusing on dimples of an Nth row among two longitudinally arranged dimples that are adjacent in the circumferential direction, (b) is an explanatory diagram of a case in which the number of longitudinally arranged dimples arranged in the circumferential direction has been increased.
Figure 5:
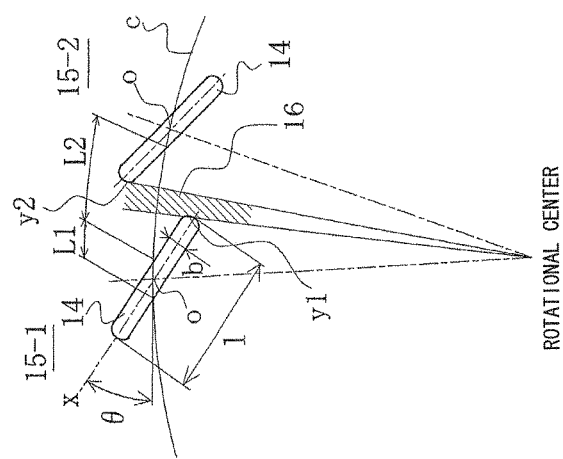

FIG. 5(a) is an enlarged explanatory drawing focusing on dimples of an Nth row among two longitudinally arranged dimples 15-1, 15-2 that are adjacent in the circumferential direction.

The center line x passing through the center o of each dimple 14 has a dimple angle θ with the tangent of a circle c passing through the center o, and each dimple 14 has a length l and a width b.

In this drawing, L1 denotes the circumferential length within a dimple 14 along the circle c passing through the center of that dimple 14, and L2 denotes the circumferential length, along the circle c, through a land area between adjacent dimples 14. The ratio between L1 and L2, or L1/L2, is defined as the gap ratio.

Even if the width b of the dimples 14 is constant, if the dimple angle θ fluctuates, the gap ratio also fluctuates because L1 and L2 fluctuate. The optimal range of the gap ratio is described hereinafter.

FIG. 5(b) is an explanatory diagram of a case in which the number of longitudinally arranged dimples 15 arranged in the circumferential direction has been increased. When the number of longitudinally arranged dimples 15 arranged in the circumferential direction is increased as shown in the drawing, the proximate tips y1, y2 of the dimples 14 of the longitudinally arranged dimples 15-1 and the dimples 14 of the longitudinally arranged dimples 15-2 overlap in the circumferential direction, and land areas in the circumferential direction are no longer formed. Thus, when land areas in the circumferential direction are not formed, sealed fluid drained by the front row dimples flows into rear row dimples on the outer side as shown by the dashed-line arrows, and there is a risk that the fluid, without spreading to land areas, will cause film tearing.

To avoid this problem, in the present invention, the proximate tips y1, y2 of circumferentially adjacent dimples 14 do not overlap in the circumferential direction, and land areas 16 in the circumferential direction are formed between the tips y1, y2, as shown in FIG. 5(a). The sealed fluid drained to the upstream side by the pumping action of the dimples 14 flows through the land areas 16 in the circumferential direction formed between the proximate tips y1, y2 of longitudinally arranged dimples 15 that are adjacent in the circumferential direction, and the land areas 16 can be lubricated sufficiently.

A ring having an outside diameter of about 10 to 100 mm is used for the mating ring 2, and in the case of such a size, the extent of the intervals with which the longitudinally arranged dimples 15 are arranged in the circumferential direction will be described.

Figure 6:
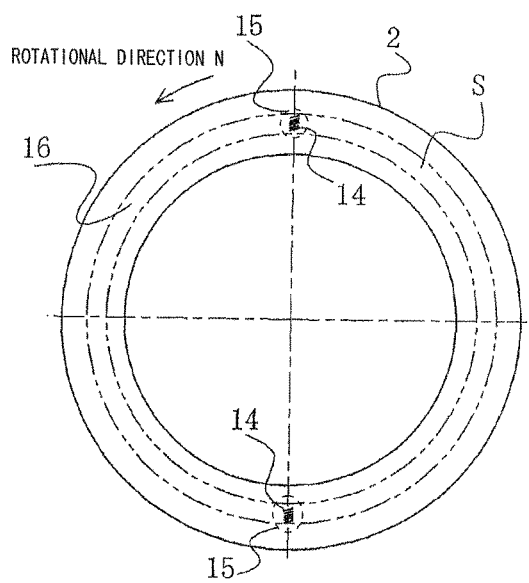
FIG. 6 is an explanatory drawing showing cases in which the outside diameter of the mating ring is 100 mm, wherein two, six, twenty-eight, and fifty-three groups of longitudinally arranged dimples are evenly spaced in the circumferential direction.
Figure 6:
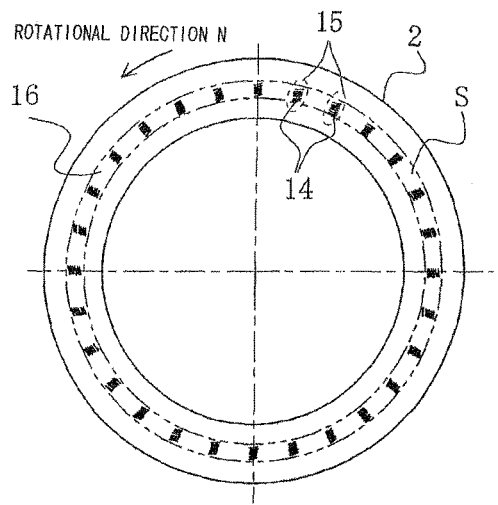
Figure 6:
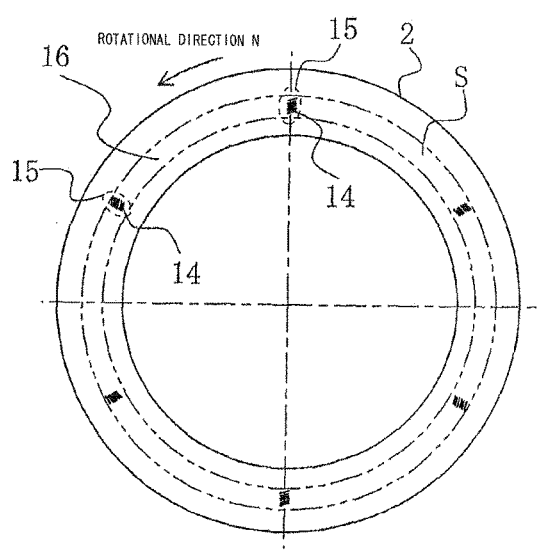
Figure 6:
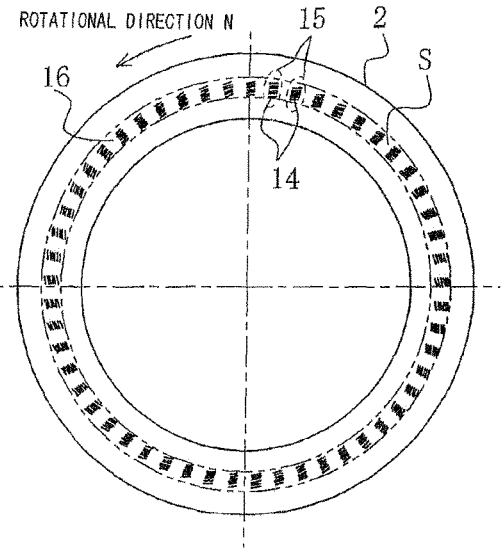
Figure 7:
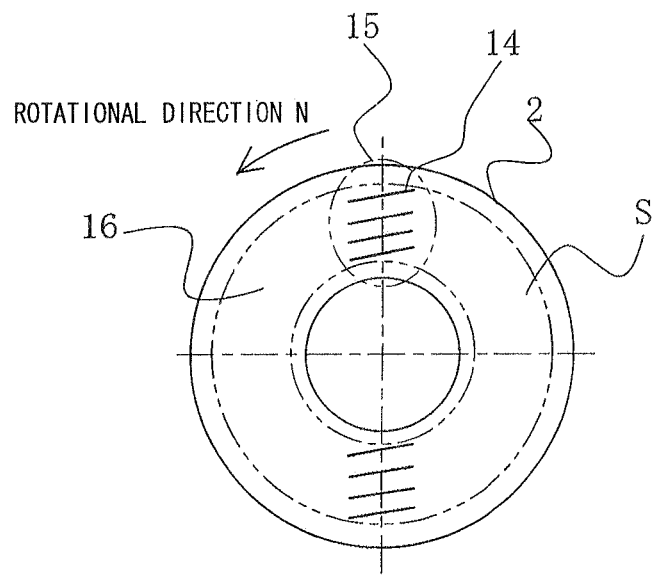
FIG. 7 is an explanatory drawing showing cases in which the outside diameter of the mating ring is 10 mm, wherein two and four groups of longitudinally arranged dimples are evenly spaced in the circumferential direction.
Figure 7:
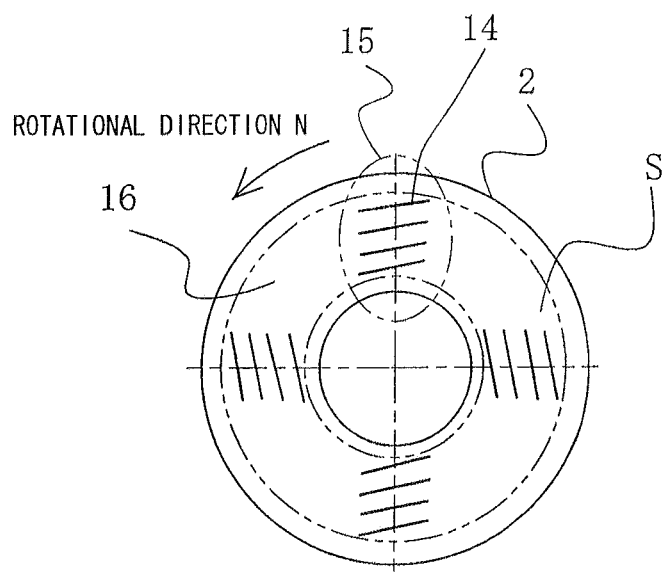

FIG. 6 shows a case in which the outside diameter of the mating ring 2 is 100 mm, and FIG. 7 shows a case in which the outside diameter of the mating ring 2 is 10 mm.

In FIG. 6(a), two groups of longitudinally arranged dimples 15 are spaced evenly in the circumferential direction with a gap ratio of 0.003, in 6(b), six groups of longitudinally arranged dimples 15 are spaced evenly in the circumferential direction with a gap ratio of 0.01, in 6(c), twenty-eight groups of longitudinally arranged dimples 15 are spaced evenly in the circumferential direction with a gap ratio of 0.05, and in 6(d), fifty-three groups of longitudinally arranged dimples 15 are spaced evenly in the circumferential direction with a gap ratio of 0.1.

In FIG. 7(a), two groups of longitudinally arranged dimples 15 are spaced evenly in the circumferential direction with a gap ratio of 0.047, and in 7(b), four groups of longitudinally arranged dimples 15 are spaced evenly in the circumferential direction with a gap ratio of 0.1.

In any case, land areas 16 in the circumferential direction are sufficiently formed between adjacent groups of longitudinally arranged dimples 15, and the land areas 16 are lubricated by the sealed fluid drained out to the upstream side by the pumping action of the dimples 14.

Neither FIG. 6 nor FIG. 7 shows a case in which the gap ratio is 0.001, but this gap ratio can easily be achieved by changing the angles and widths of the dimples 14.

There are various patterns for the number of dimples 14 and their angles within the longitudinally arranged dimples 15. The number of dimples 14 is not limited; five may be used in the example of FIG. 3, six in the example of FIG. 6, and four in the example of FIG. 7. A description based on FIG. 8 is given of a method for calculating the gap ratio for a case in which these various patterns of longitudinally arranged dimples 15 are formed on one sealing surface.

FIG. 8 shows the sealing surface S in a linear depiction for the sake of convenience in the description. FIG. 8(a) shows a case in which the number of dimples 14 and their positions in the radial direction are different between adjacent groups of longitudinally arranged dimples 15, wherein on the left side of the drawing, five dimples 14 are shifted outward in the radial direction, while on the right side of the drawing, four dimples 14 are shifted inward in the radial direction. In this case, the outermost diameter of all of the dimples 14 is denoted as OD, the innermost diameter is denoted as ID, the middle between the outermost diameter OD and the innermost diameter ID is denoted as the center diameter, and the gap ratio is calculated assuming imaginary dimples (the dashed lines) along the position of the center diameter.

FIG. 8(b) shows a case in which dimples 14 slightly misaligned in both the circumferential direction and the radial direction are present in the groups of longitudinally arranged dimples 15. In this case, the outermost diameter of all of the dimples 14 is denoted as OD, the innermost diameter is denoted as ID, the middle between the outermost diameter OD and the innermost diameter ID is denoted as the center diameter, and the gap ratio is calculated assuming imaginary dimples (the dashed lines) along the position of the center diameter and in the circumferential center of the longitudinally arranged dimples 15. Furthermore, the gap ratio is calculated based on the average dimple angle θ in cases in which there are dimples 14 having different dimple angles θ among the longitudinally arranged dimples 15.

In the present invention, even if a group of longitudinally arranged dimples 15 has dimples 14 shifted in the circumferential direction and radial direction as shown in FIG. 8(b), it can be considered as a single group of longitudinally arranged dimples 15 if the dimples 14 overlap each other in any location in the radial direction.

When there are land areas 16 present between adjacent groups of longitudinally arranged dimples 15 as shown in FIG. 8(b), there will be multiple groups of longitudinally arranged dimples 15, but when the dimples are continuous throughout the entire periphery without any land areas 16 between adjacent groups of longitudinally arranged dimples 15-1 and 15-2 as shown in FIG. 5(b), there will only be one group of longitudinally arranged dimples 15.

FIG. 9(a) shows a case in which dimples 14 adjacent in the radial direction within one group of longitudinally arranged dimples 15 are arranged so as to not overlap in the radial direction, and FIG. 9(b) shows a case in which dimples 14 adjacent in the radial direction within one group of longitudinally arranged dimples 15 are arranged so as to overlap in the radial direction.

When dimples 14 adjacent in the radial direction have been arranged so as to not overlap each other in the radial direction as in FIG. 9(a), the sealed fluid can pass between adjacent dimples 14 and flow in the circumferential direction, and a film of the fluid is therefore formed on the land areas 16, improving the lubricating effect.

Conversely, when dimples 14 adjacent in the radial direction have been arranged so as to overlap each other in the radial direction as in FIG. 9(b), the sealed fluid, being unable to pass between adjacent dimples 14 and flow in the circumferential direction, is pumped out to the outer periphery by the dimples 14, and there is therefore a possibility that a sufficient film of fluid will not be formed on the land areas 16.

The shape of the dimples 14 is preferably one that is not easily ruined by abrasion powder. The method for machining the dimples 14 can use a photosensitive film for sandblasting. In this method, a photosensitive film for sandblasting is attached over the dimple machining surface, i.e., the sealing surface 9 of the mating ring 2. A positive film imprinted with the shape of the dimples 14 is then adhered and the photosensitive film for sandblasting is exposed to light. Dimples 14 that coincide with the pattern of the positive film can then be formed by developing the photosensitive film for sandblasting and performing sandblasting. It is easy to create the shape of the photosensitive film for sandblasting because the film is developed from the positive film created by CAD data. As another machining method, the dimples 14 can be machined by a laser.

Figure 10:
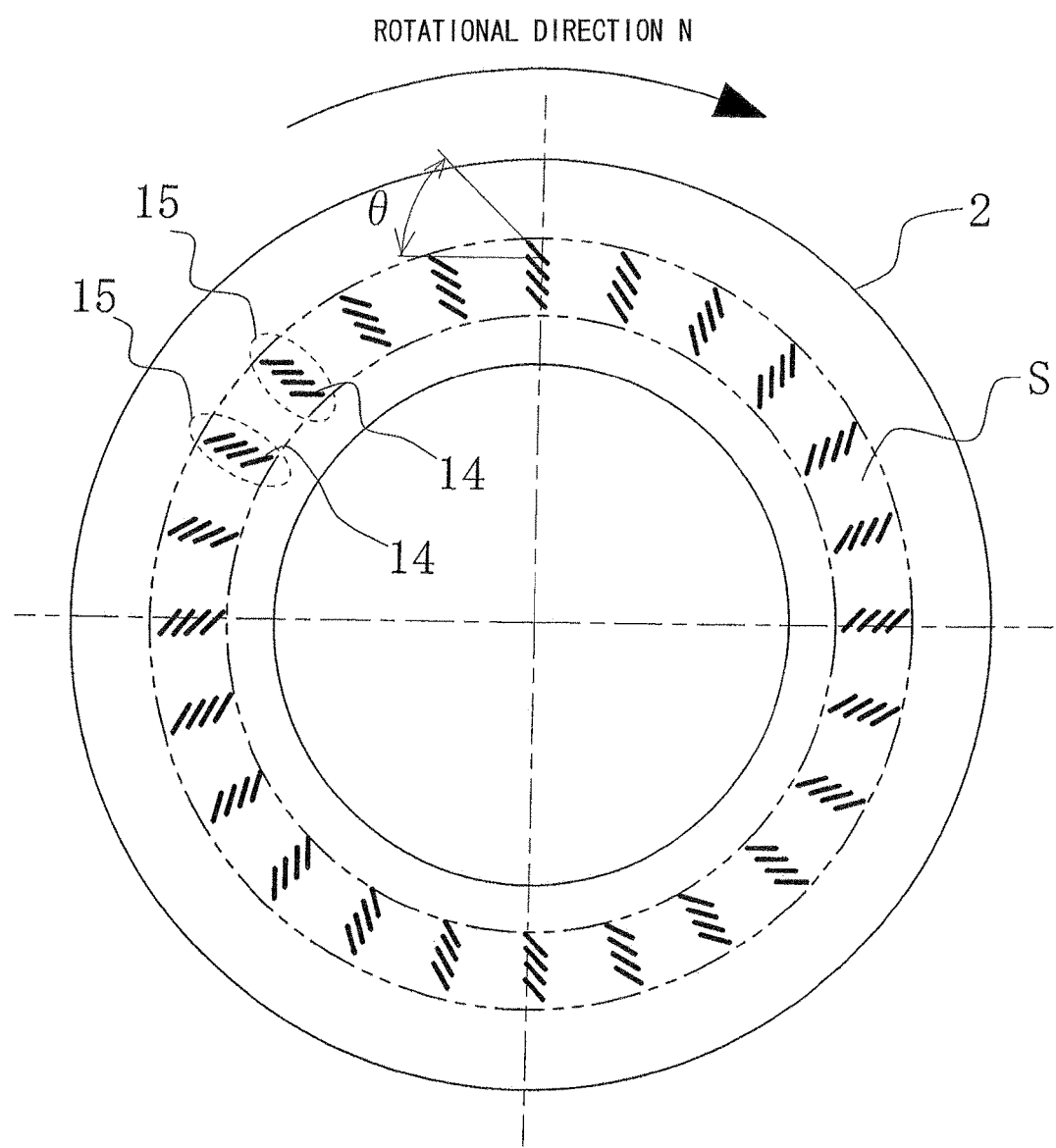
FIG. 10 shows an example according to an embodiment of the present invention in which, within the multiple groups of longitudinally arranged dimples formed in the circumferential direction, the dimples do not pass through to either the upstream side or the downstream side of the sealing surface.
Figure 11:
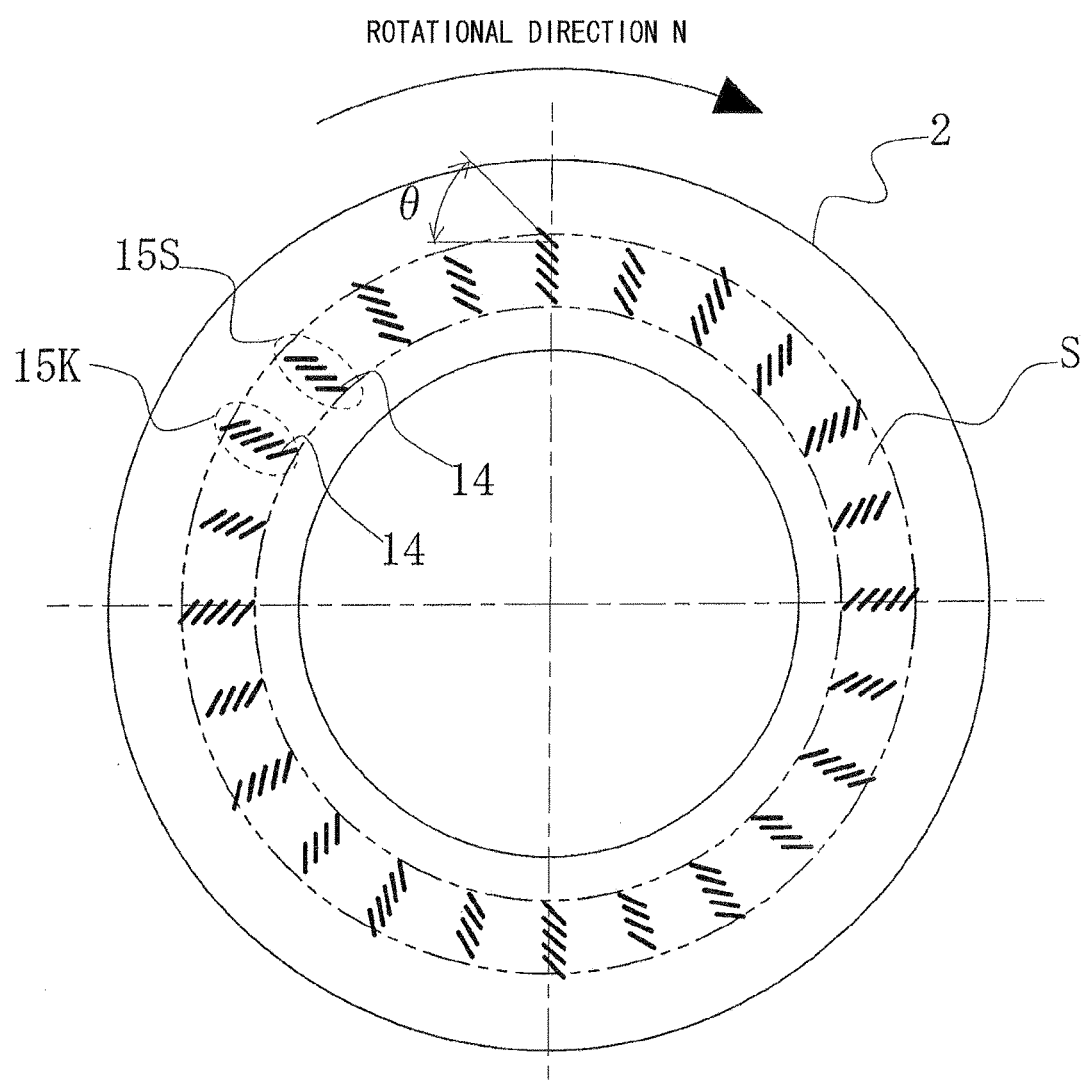
FIG. 11 shows an example according to an embodiment of the present invention in which, among the multiple groups of longitudinally arranged dimples formed in the circumferential direction, the dimple groups alternate between longitudinally arranged dimples that pass through to the upstream side and longitudinally arranged dimples that do not pass through to the upstream side.
Figure 12:
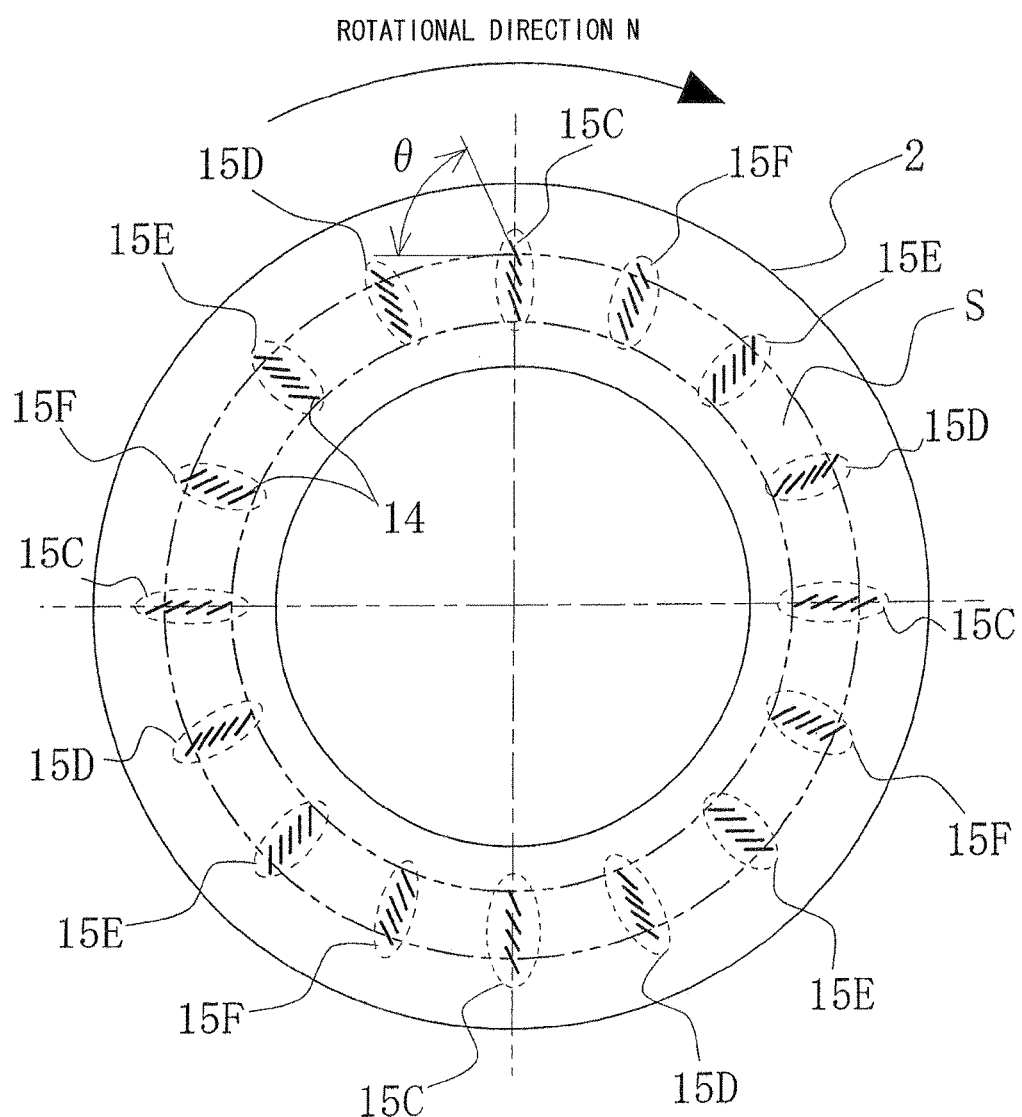
FIG. 12 shows an example according to an embodiment of the present invention in which, among the multiple groups of longitudinally arranged dimples formed in the circumferential direction, there is a combination of dimple groups which have different dimple angles θ.

FIGS. 10 through 12 show another embodiment of the present invention.

FIG. 10 shows an example in which, within the multiple groups of longitudinally arranged dimples 15 formed in the circumferential direction, the dimples 14 do not pass through to either the upstream side or the downstream side of the sealing surface S.

In this example, since the dimples 14 do not pass through to the upstream side, the sealed fluid is not directly drained out to the upstream side, and the dimples 14 have less of a pumping effect. Therefore, this embodiment is appropriate for cases such as when the pressure difference between the upstream side and the downstream side is small.

FIG. 11 shows an example in which, among the multiple groups of longitudinally arranged dimples 15 formed in the circumferential direction, the dimple groups alternate between longitudinally arranged dimples 15K that pass through to the upstream side and longitudinally arranged dimples 15S that do not pass through.

The pumping effect provided by the dimples 14 can be adjusted by suitably varying the ratio between the longitudinally arranged dimples 15K that pass through to the upstream side and the longitudinally arranged dimples 15S that do not pass through, according to conditions.

FIG. 12 shows an example in which, among the multiple groups of longitudinally arranged dimples 15 formed in the circumferential direction, there is a combination of dimple groups 15C, 15D, 15E, and 15F which have different dimple angles θ. In this example, the arrangement of dimple groups repeats along the rotational direction, in sequence of increasingly larger dimple angles θ. It is possible to adapt to a wide range of rotational speeds by combining dimple groups having different dimple angles θ, as in the case of this arrangement.

Figure 13:
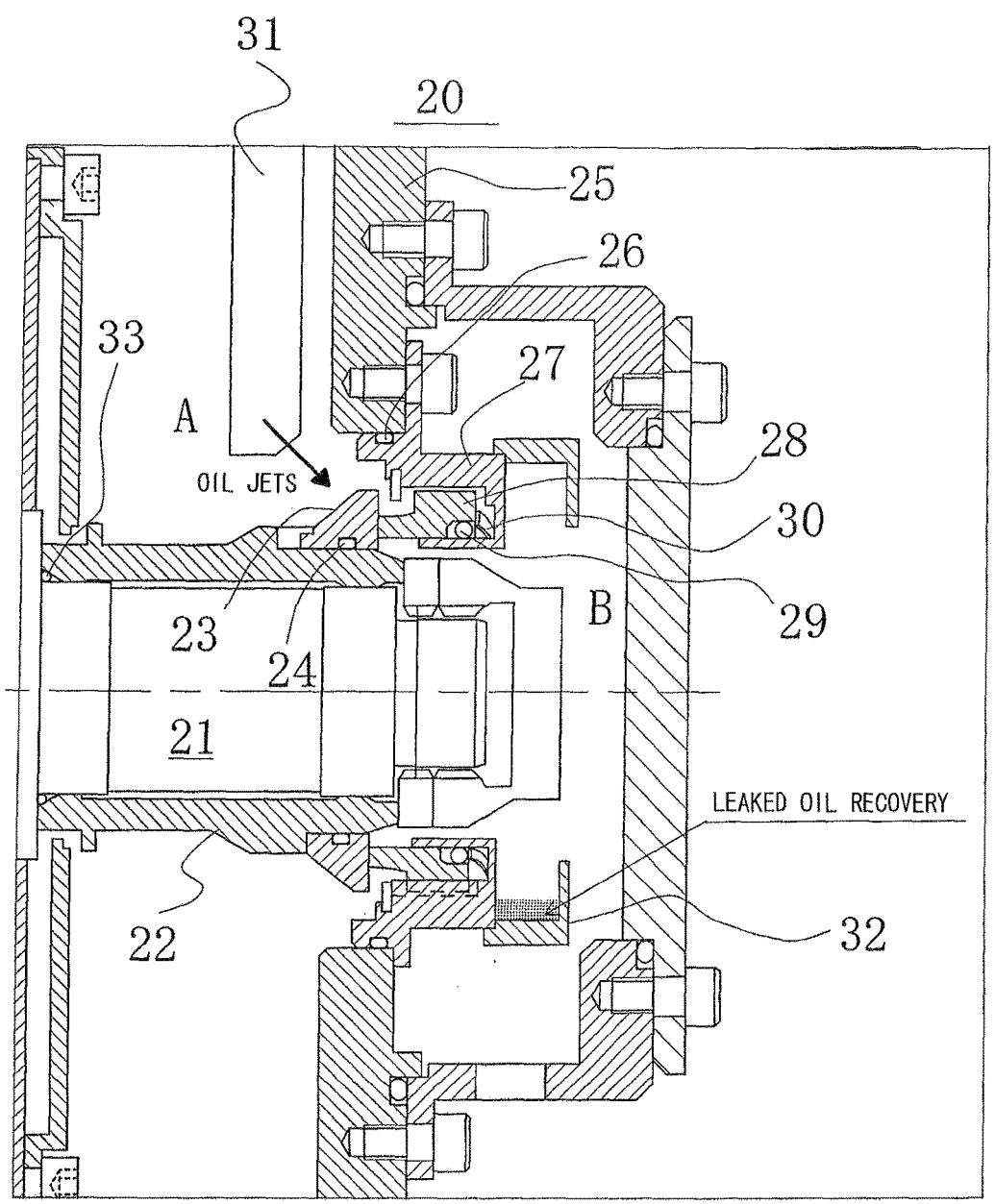
FIG. 13 is a cross-sectional view of a mechanical seal testing machine in which the sealing device of the present invention is tested.

FIG. 13 is a cross-sectional view of a mechanical seal testing machine in which the sealing device of the present invention is tested.

In FIG. 13, a sealing device testing machine 20 has a rotating shaft 21 provided in the center and a sleeve 22 provided to the outer periphery of the rotating shaft 21 via an O ring 33, wherein a mating ring 23 is attached on the outer periphery of the sleeve 22 via an O ring 24.

A sealing ring 28 is provided to be capable of moving in the axial direction via an O ring 29 to a seal housing 27 mounted via an O ring 26 on a casing 25. The sealing ring 28 is urged by a wave spring 30 toward the mating ring 23.

An oil ejection device 31 for ejecting oil jets onto the mechanical seal is provided in a high-pressure side (the upstream side) A. A leaked oil recovery device 32 for storing oil that has leaked from the sealing surface is provided in a low-pressure side (the downstream side) B.

Dimples according to the present invention are formed in the sealing surface of the mating ring 23, and the mating ring 23 is designed to be easily replaceable.

Figure 14:
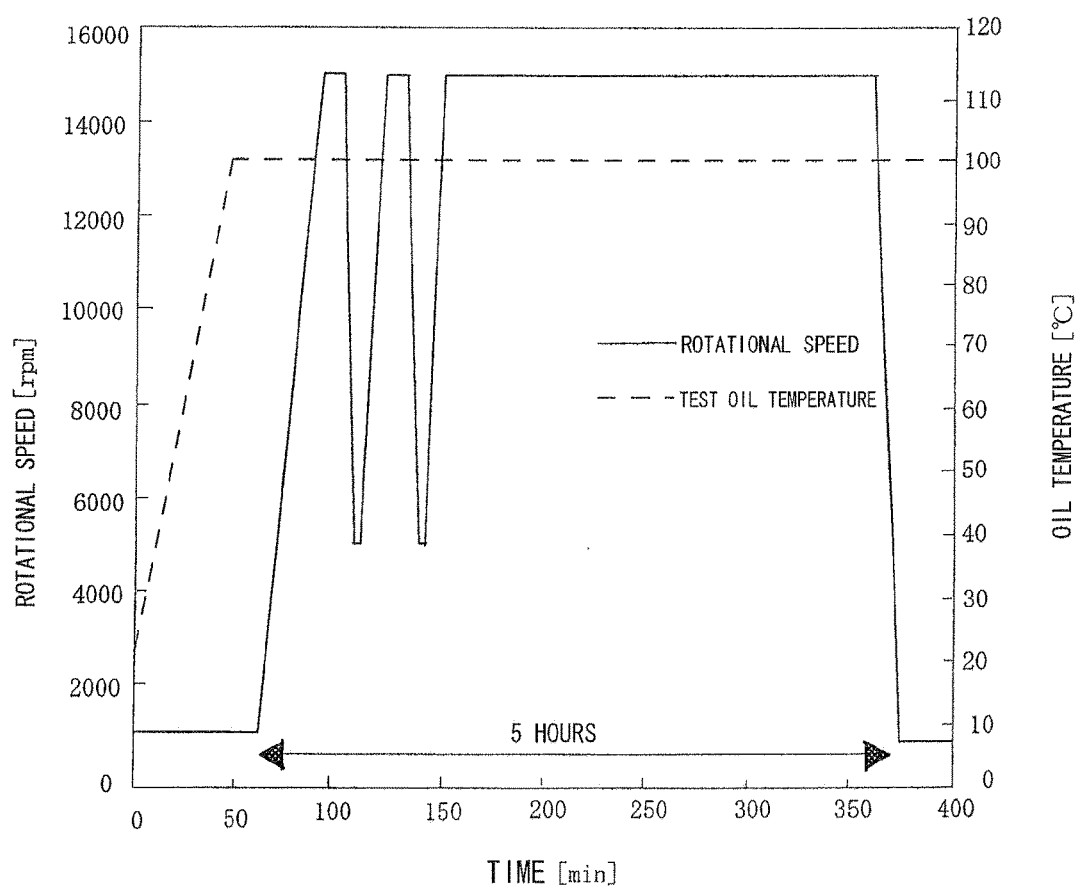
FIG. 14 shows the testing time (min) of the test using the testing machine shown in FIG. 13 along the horizontal axis, and the rotational speed (rpm) and test oil temperature (° C.) of the testing machine along the vertical axes.

FIG. 14 shows the testing time (min) of the test using the testing machine 20 shown in FIG. 13 along the horizontal axis, and the rotational speed (rpm) and test oil temperature (° C.) of the testing machine 20 along the vertical axes.

The rotational speed was started at 1000 rpm, then increased to about 15000 rpm (the rotational speed at full power) after the test oil temperature had reached 100° C., then reduced to 5000 rpm (the rotational speed during idling), repeatedly alternated several times between 5000 rpm and 15000 rpm, and thereafter maintained at 15000 rpm. The test oil temperature was kept at 100° C. to match the common conditions in an aircraft gearbox.

Figure 15:
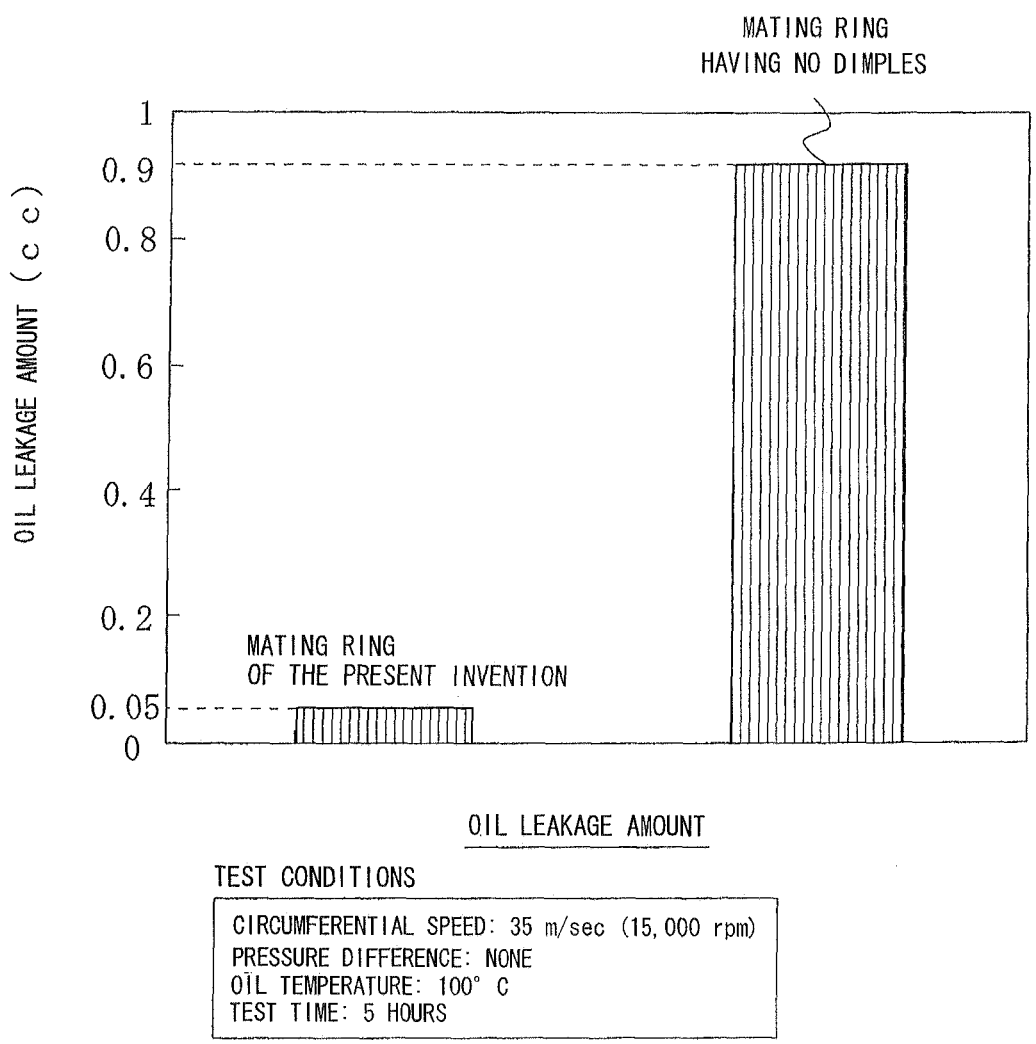
FIG. 15 shows the test results of the oil leakage amount with the mating ring according to the embodiment of the present invention and with a mating ring having no dimples.

FIG. 15 shows the test results after having measured the oil leakage amount with the mating ring according to the embodiment of the present invention and with a mating ring having no dimples, using the testing machine 20 of FIG. 13 under the test conditions of FIG. 14.

The oil leakage amount was 0.05 cc when the mating ring according to the embodiment of the present invention was used, and was 0.9 cc when the mating ring having no dimples was used. It can be seen that when the mating ring according to the embodiment of the present invention was used, the amount of oil leakage was reduced to ⅛ of the amount when the mating ring without dimples was used.

Next, the pumping effects of the dimples and the surface pressure of the sealing surface will be described for when the dimple angle θ, the dimple length, width, and depth, and the gap ratio L1/L2 are varied.

Figure 16:
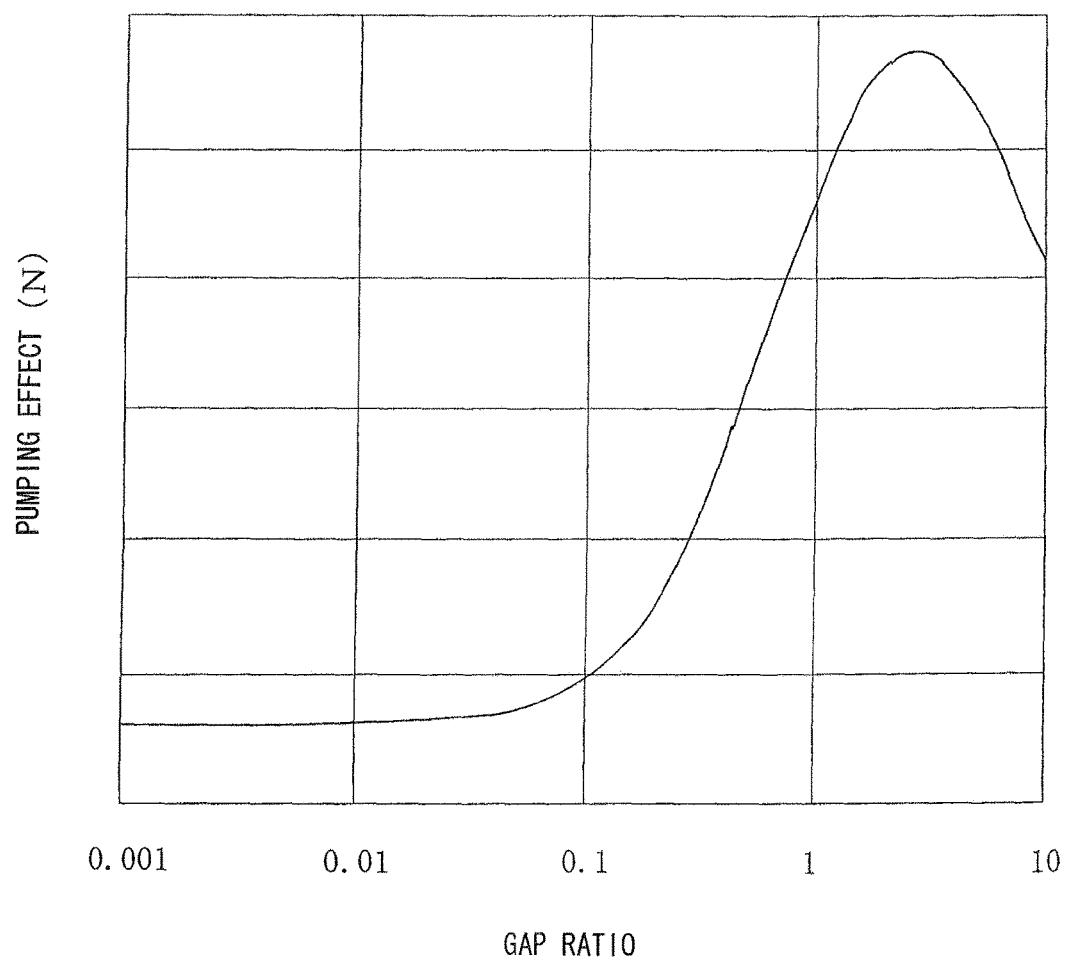
FIG. 16 shows a single logarithmic graph of the relationship between the gap ratio L1/L2 and the pumping effect (N) of the sealing device according to the embodiment of the present invention.

FIG. 16 shows a single logarithmic graph of the relationship between the gap ratio L1/L2 and the pumping effect of the sealing device according to the embodiment of the present invention.

The pumping effect shows a tendency to increase as the gap ratio increases. It can be seen that the pumping effect increases when the gap ratio is 0.1 to 10.

The extent of the pumping effect is affected by the gap ratio, but it is also clear that providing dimples yields a pumping effect.

Figure 17:
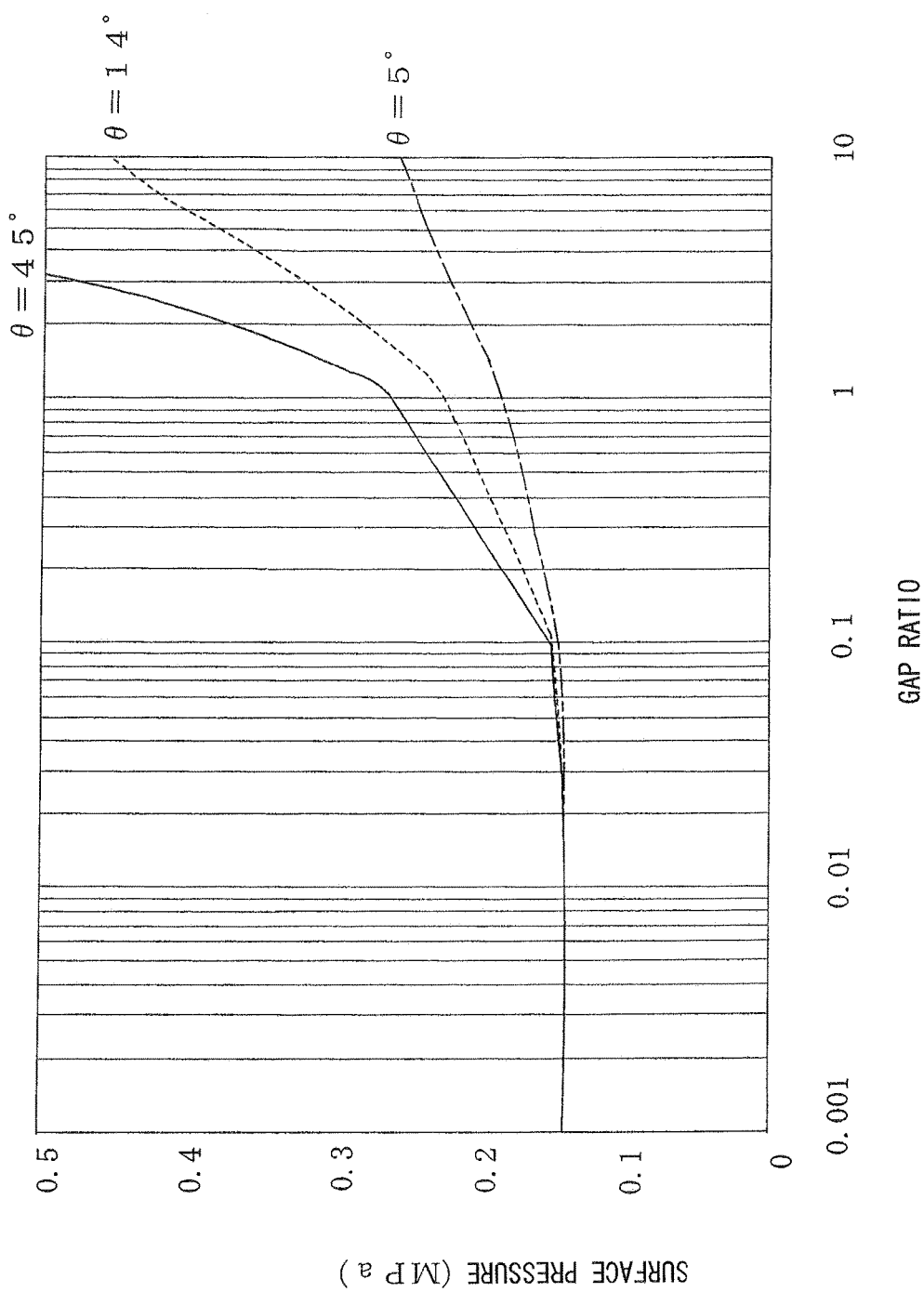
FIG. 17 shows a single logarithmic graph of the relationship between the gap ratio L1/L2 and the surface pressure (MPa) of the sealing surface S in the sealing device according to the embodiment of the present invention.

FIG. 17 shows a single logarithmic graph of the relationship between the gap ratio L1/L2 and the surface pressure (MPa) of the sealing surface S in the sealing device according to the embodiment of the present invention.

The surface pressure shows a tendency to increase as the gap ratio increases. When the gap ratio exceeds 0.1, the surface pressure increases rapidly. At a high surface pressure, oil leakage is suppressed, but on the other hand, there is excessive heat generation and excessive abrasion.

In FIG. 16, the pumping effect increases when the gap ratio is 0.1 to 10, but since increasing the gap ratio yields a larger total number of dimples, the surface area of the land areas in the sealing surface S decreases. Therefore, the surface pressure increases because there is less surface area bearing the force pressing the sealing surface S in the axial direction.

It can be seen from these facts that the gap ratio L1/L2 is preferably set within a range of $0.001 \leq L1/L2 \leq 0.1$.

Figure 18:
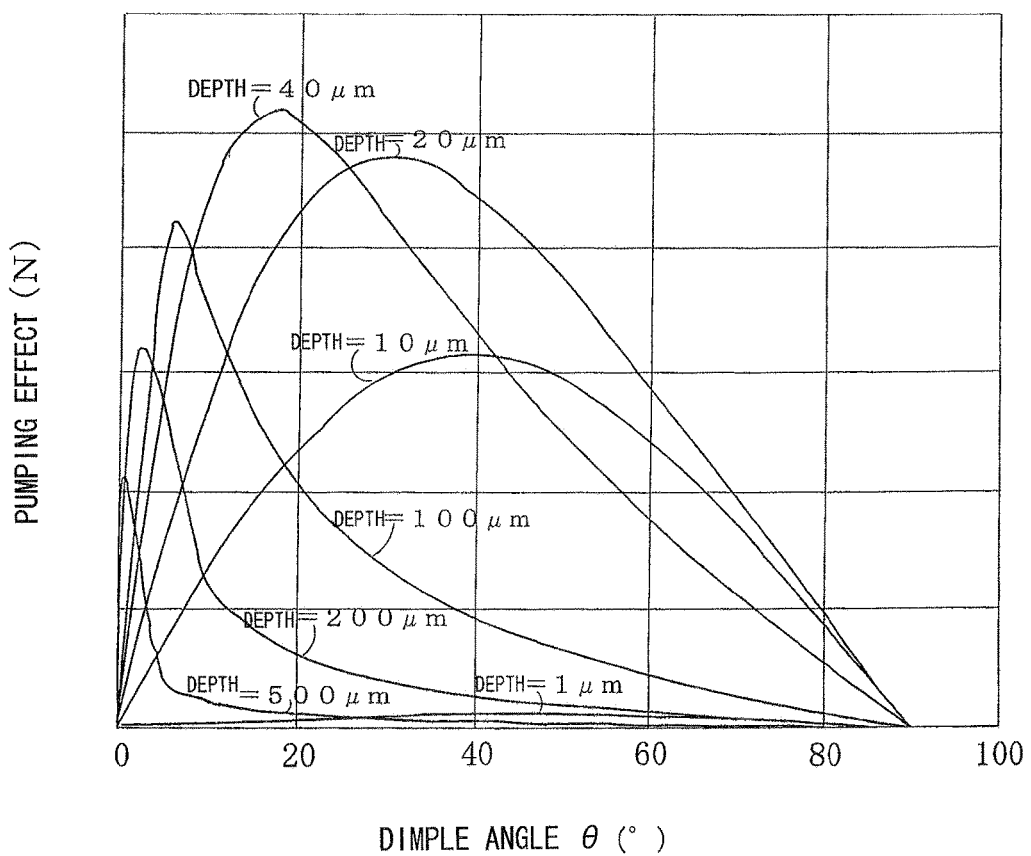
FIG. 18 shows the relationship between the dimple angle θ (°) and pumping effect (N) of the sealing device according to the embodiment of the present invention.

FIG. 18 shows the relationship between the dimple angle θ (°) and pumping effect (N) of the sealing device according to the embodiment of the present invention.

It can be seen that the pumping effect is achieved within a dimple angle θ range of 0<θ<90°.

When the depth (μm) of the dimples is less than 1 μm, little pumping effect is achieved; when the depth is 500 μm, the pumping effect peaks in a range of 0<θ<5°; and it can therefore be seen that the pumping effect changes with only a small tilt of the dimples.

Therefore, the depth of the dimples is preferably in a range of 1 to 200 μm.

Figure 19:
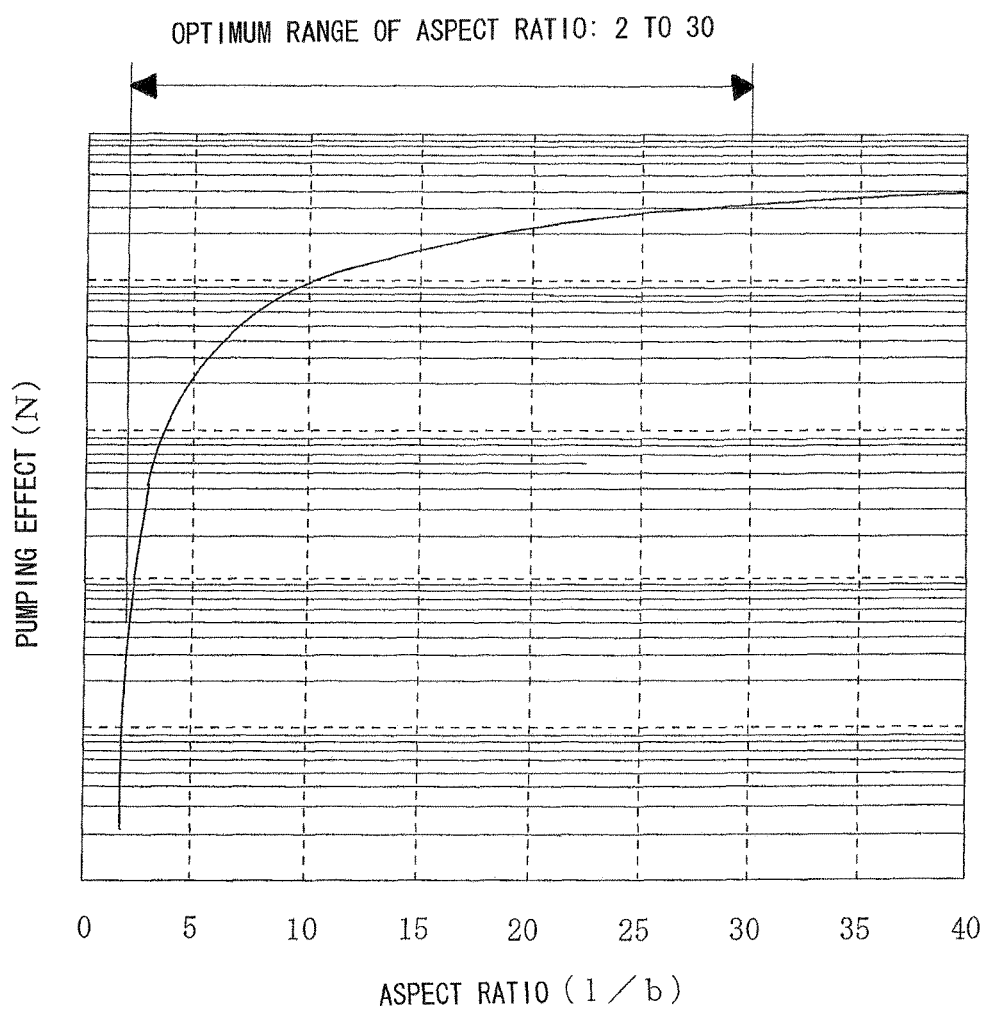
FIG. 19 shows a single logarithmic graph of the relationship between the dimple aspect ratio and the pumping effect of the sealing device according to the embodiment of the present invention.
Figure 20:
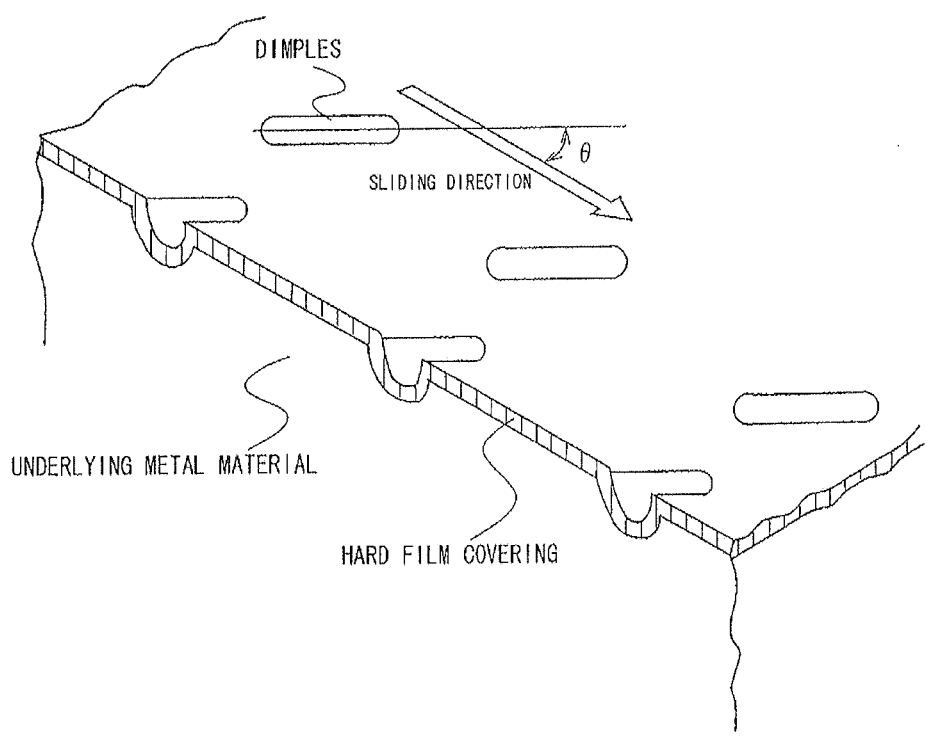
FIG. 20 is a perspective view for describing Prior Art 1.
Figure 21:
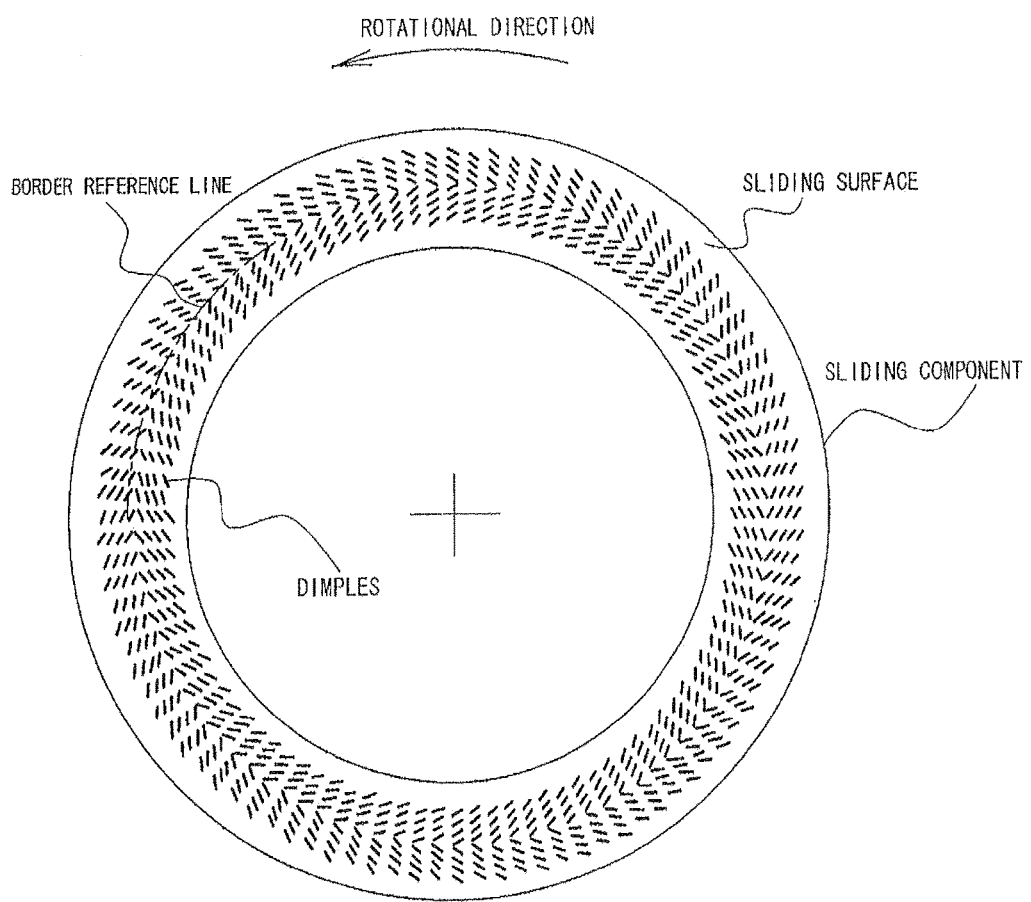
FIG. 21 is a front view showing the sliding surface of Prior Art 2.
Figure 22:
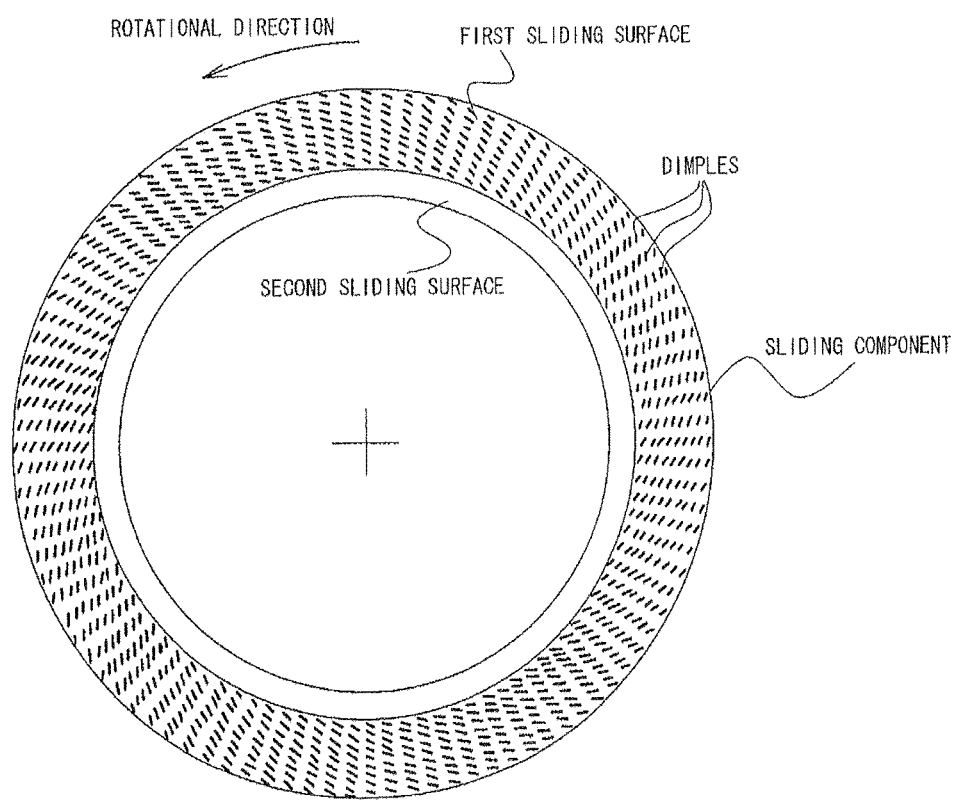
FIG. 22 is a front view showing the sliding surface of Prior Art 3.

FIG. 19 shows a single logarithmic graph of the relationship between the dimple aspect ratio (l/b) and the pumping effect (N) of the sealing device according to the embodiment of the present invention.

When the aspect ratio l/b of the dimples is 2 or less, there is little pumping effect. When the aspect ratio l/b increases, the pumping effect increases, but when the ratio exceeds 30, a dry environment arises in which the sealed fluid is insufficient, leading to excessive abrasion. Therefore, it can be seen that 2 to 30 is the optimal range for the aspect ratio l/b between the width b and the length l of the dimples.

An example was described above in which the dimples 14 were provided to the sealing surface 9 of the mating ring 2, which is the rotating-side sealing element, but when the dimples 14 are provided to the sealing surface 8 of the seal ring 4, which is the stationary-side sealing element, the dimples must be provided so that their tips in the rotational direction relative to the seal ring 4 are tilted towards the inner periphery side.

KEY

1 Mechanical seal
2 Mating ring (rotating-side sealing element)
3 O ring
4 Seal ring (stationary-side sealing element)
5 Recession
6 Protuberance
7 Wave spring
8 Sealing surface of seal ring
9 Sealing surface of mating ring
10 Washer
11 O ring groove
12 O ring
13 Leakage path of sealed fluid in conventional sealing surface
14 Dimple
15 Group of longitudinally arranged dimples
16 Land areas in circumferential direction formed between proximate tips
17 Arrows showing pumping action
18 Trajectory of sealed fluid in sealing surface
20 Testing machine for sealing device
21 Rotating shaft
22 Sleeve
23 Mating ring
24 O ring
25 Casing
26 O ring
27 Seal housing
28 Sealing ring
29 O ring
30 Wave spring
31 Oil ejection device
32 Leaked oil recovery device
33 O ring
50 Rotating shaft
60 Seal housing
70 Casing
71 Bolt
72 O ring
73 Bearing
S Sealing surface
A High-pressure side (upstream side)
B Low-pressure side (downstream side)
θ Dimple angle
o Center of dimple
l Length of dimple
b Width of dimple
x Center line of dimple
L1 Circumferential length of dimple along circle passing through center of dimple
L2 Circumferential length of land area between adjacent dimples along circle passing through centers of dimples
y1 Proximate end of dimple adjacent in circumferential direction
y2 Proximate end of dimple adjacent in circumferential direction

The invention claimed is:

1. A sealing device having a contact-type mechanical sealing structure in which a stationary-side sealing element and a rotating-side sealing element slide intimately against each other between a seal housing and a rotating shaft inserted through an inner periphery of the seal housing, the format of the sealing device being adapted for sealing a fluid prone to leak from an outer periphery of a sealing surface toward an inner periphery; wherein the sealing device includes two or more groups of a plurality of dimples longitudinally arranged in a radial direction are formed around a circumferential direction on a sealing surface of the stationary-side sealing element or the rotating-side sealing element, the dimples have a dimple angle θ at which their tips in the rotational direction are tilted toward the inner periphery, the angle θ is expressed by the relation $5 \leq \theta < 45°$, land areas in the circumferential direction are formed between proximate tips of adjacent groups of the longitudinally arranged dimples, and dimples adjacent in the radial direction within one group of longitudinally arranged dimples are arranged so as to not overlap in the radial direction, and the dimples in individual rows of the dimples longitudinally arranged in the radial direction are aligned so that a gap ratio L1/L2, which represents the ratio between the length L1 of a dimple along the circumference of a circle passing through the center of the dimple and the length L2, along the circumference of the same circle, of the land area formed between adjacent dimples, is within the range indicated by the expression below:

$$0.001 \leq L1/L2 \leq 0.1$$

wherein the depth of the dimples is 10 to 100 μm, and the aspect ratio l/b between the length l and the width b of the dimples is 10 to 30, whereupon lubricity of the sealing surface is increased, preventing the sealed fluid from leaking, and also preventing excessive abrasion and excessive heat generation in the sealed surfaces.

2. The sealing device according to claim 1, wherein the gap ratio L1/L2 is in a range of $0.001 \leq L1/L2 \leq 0.05$.

3. The sealing device according to claim 1, wherein the dimples in the individual rows of the dimples longitudinally arranged in the radial direction do not pass through to the inner periphery side of the sealing surface.

4. The sealing device according to claim 2, wherein the dimples in the individual rows of the dimples longitudinally arranged in the radial direction do not pass through to the inner periphery side of the sealing surface.

* * * * *